United States Patent
Yoshida et al.

(10) Patent No.: US 11,603,441 B2
(45) Date of Patent: Mar. 14, 2023

(54) METHACRYLIC RESIN, SHAPED ARTICLE, AND OPTICAL COMPONENT OR AUTOMOTIVE PART

(71) Applicant: ASAHI KASEI KABUSHIKI KAISHA, Tokyo (JP)

(72) Inventors: Junichi Yoshida, Tokyo (JP); Yutaka Tada, Tokyo (JP); Takuto Nakata, Tokyo (JP); Miyuki Kazunori, Tokyo (JP)

(73) Assignee: ASAHI KASEI KABUSHIKI KAISHA, Tokyo (JP)

(*) Notice: Subject to any disclaimer, the term of this patent is extended or adjusted under 35 U.S.C. 154(b) by 234 days.

(21) Appl. No.: 17/252,731

(22) PCT Filed: Jul. 9, 2019

(86) PCT No.: PCT/JP2019/027217
§ 371 (c)(1),
(2) Date: Dec. 16, 2020

(87) PCT Pub. No.: WO2020/013203
PCT Pub. Date: Jan. 16, 2020

(65) Prior Publication Data
US 2021/0214477 A1    Jul. 15, 2021

(30) Foreign Application Priority Data

Jul. 13, 2018 (JP) .............................. JP2018-133477
Jul. 13, 2018 (JP) .............................. JP2018-133478
Oct. 26, 2018 (JP) .............................. JP2018-201934

(51) Int. Cl.
*C08F 220/14* (2006.01)
*C08F 222/40* (2006.01)
(Continued)

(52) U.S. Cl.
CPC ............... *C08J 5/18* (2013.01); *C08F 120/14* (2013.01); *C08F 222/402* (2020.02); *C08F 2/38* (2013.01);
(Continued)

(58) Field of Classification Search
None
See application file for complete search history.

(56) References Cited

U.S. PATENT DOCUMENTS

2009/0306321 A1   12/2009 Koike
2013/0072651 A1    3/2013 Yonemura et al.
(Continued)

FOREIGN PATENT DOCUMENTS

CN    101040195 A    9/2007
CN    102906130 A    1/2013
(Continued)

OTHER PUBLICATIONS

Oct. 8, 2019, International Search Report issued in the International Patent Application No. PCT/JP2019/027217.
(Continued)

*Primary Examiner* — Richard A Huhn
(74) *Attorney, Agent, or Firm* — Kenja IP Law PC

(57) ABSTRACT

A methacrylic resin having a cyclic structure in a main chain thereof, a shaped article, and an optical component or automotive part, in which the glass transition temperature is higher than 120° C. and 160° C. or lower, and the sign of the orientational birefringence when being oriented so as to have a degree of orientation of 0.03 is different from the sign of the orientational birefringence when being oriented so as to have a degree of orientation of 0.08.

13 Claims, 1 Drawing Sheet

(51) Int. Cl.
  *C08J 5/18*   (2006.01)
  *C08F 120/14*   (2006.01)
  *C08F 2/38*   (2006.01)
  *C08F 8/48*   (2006.01)
  *C08F 8/16*   (2006.01)

(52) U.S. Cl.
  CPC .................. *C08F 8/16* (2013.01); *C08F 8/48* (2013.01); *C08F 220/14* (2013.01); *C08F 222/40* (2013.01)

(56) References Cited

U.S. PATENT DOCUMENTS

| | | |
|---|---|---|
| 2016/0025898 A1 | 1/2016 | Kitayama et al. |
| 2016/0319121 A1 | 11/2016 | Kitayama |
| 2016/0326289 A1 | 11/2016 | Kitayama et al. |

FOREIGN PATENT DOCUMENTS

| | | |
|---|---|---|
| JP | H06240017 A | 8/1994 |
| JP | 2006131689 A | 5/2006 |
| JP | 2006308682 A | 11/2006 |
| JP | 2006328330 A | 12/2006 |
| JP | 2007297620 A | 11/2007 |
| JP | 2008015199 A | 1/2008 |
| JP | 2009270021 A | 11/2009 |
| JP | 2011043619 A | 3/2011 |
| JP | 2013014659 A | 1/2013 |
| JP | 2013097192 A | 5/2013 |
| JP | 2014181256 A | 9/2014 |
| JP | 2015101707 A | 6/2015 |
| JP | 2015197483 A | 11/2015 |
| JP | 2015205997 A | 11/2015 |
| JP | 2016071274 A | 5/2016 |
| JP | 2017132981 A | 8/2017 |
| JP | 2017165939 A | 9/2017 |
| JP | 2017226816 A | 12/2017 |
| JP | 2018009141 A | 1/2018 |
| JP | 2018053216 A | 4/2018 |
| JP | 2018188569 A | 11/2018 |
| JP | 2020063436 A | 4/2020 |
| TW | 201202277 A | 1/2012 |
| WO | 2011149088 A1 | 12/2011 |
| WO | 2015098775 A1 | 7/2015 |
| WO | 2015098980 A1 | 7/2015 |

OTHER PUBLICATIONS

Jul. 29, 2021, Partial Supplementary European Search Report issued by the European Patent Office in the corresponding European Patent Application No. 19834884.9.

Jan. 19, 2021, International Preliminary Reporton Patentability issued in the International Patent Application No. PCT/JP2019/027217.

Nov. 5, 2020, PCT Third Party Observation issued in the International Patent Application No. PCT/JP2019/027217.

Nov. 3, 2021, the Supplementary European Search Report issued by the European Patent Office in the corresponding European Patent Application No. 19834884.9.

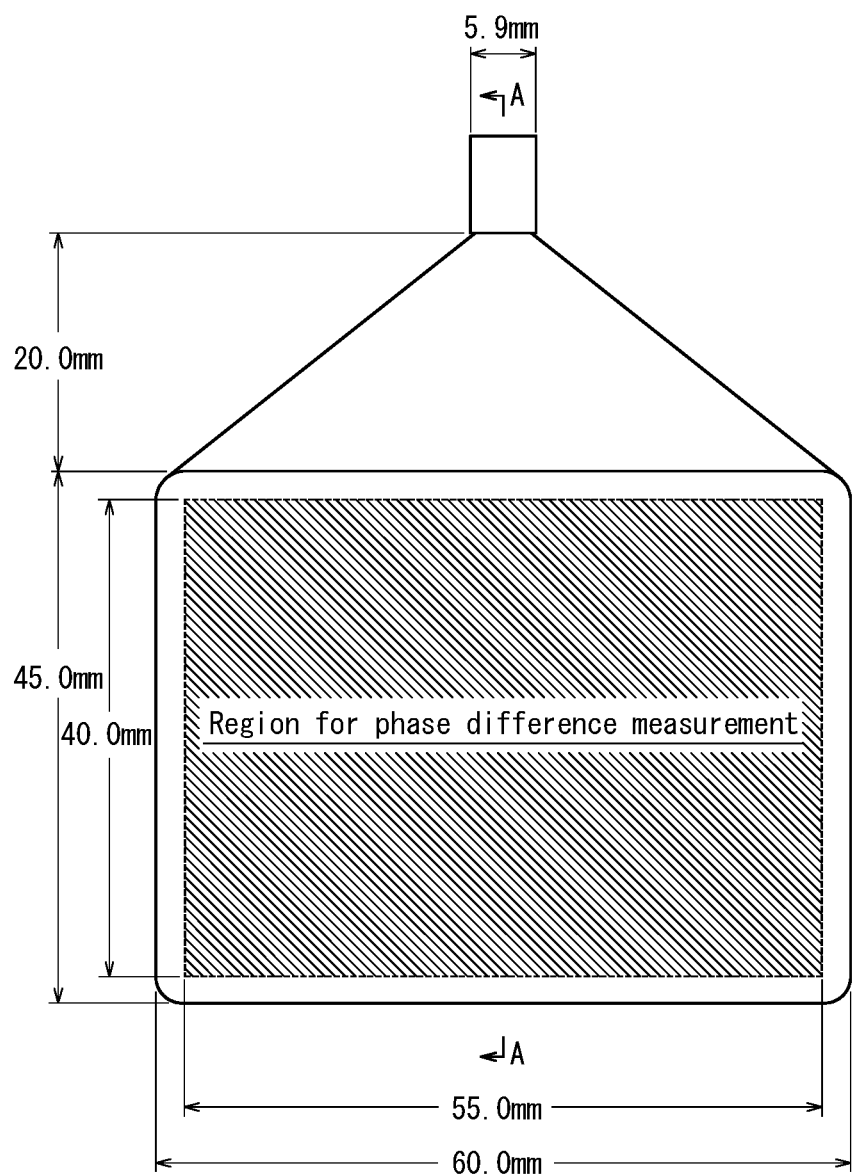
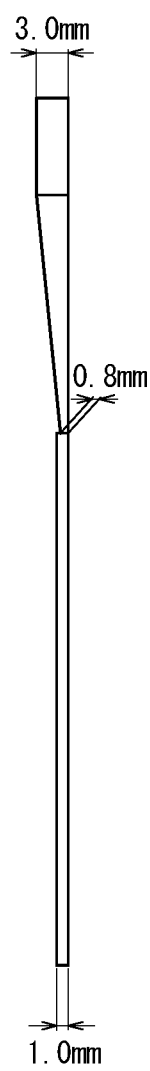
FIG. 1A
FIG. 1B

METHACRYLIC RESIN, SHAPED ARTICLE, AND OPTICAL COMPONENT OR AUTOMOTIVE PART

TECHNICAL FIELD

The present disclosure relates to a methacrylic resin which has a high heat resistance, exhibits a high level of control on the birefringence, and is suitable for injection molding applications, to a shaped article produced from this methacrylic resin, and to an optical component or an automotive part including this shaped article.

BACKGROUND

For optical components such as lens and prisms, glass has been conventionally used. In recent years, however, usage of plastics has increased in light of their light weight, their capability of achieving size reductions, and high flexibility of design, such as aspherizing of lenses. Plastics which are widely used for optical components include methacrylic resins, styrene resins, polycarbonate, and cycloolefin resins.

In general, plastics are likely to experience birefringence induced by orientation during molding processes, which adversely affects the imaging performance of plastics molded into optical components. In a case where plastics are molded using the injection molding technique having a high productivity, the plastics are more likely to be oriented, which remarkably affects the imaging performance. Methacrylic resins exemplified by polymethyl methacrylate have small intrinsic birefringence and relatively small orientational birefringence, and thus have been preferably used for optical components. The demand for higher optical performances, however, has created the need for materials which are capable of further reducing the orientational birefringence.

For example, PTLs 1 and 2 disclose that a copolymer produced through copolymerization of monomers including methyl methacrylate, 2,2,2-trifluoroethyl methacrylate, and benzyl methacrylate can reduce the orientational birefringence and the photoelastic birefringence. This is based on the idea that the orientational birefringence and the photoelastic birefringence of a copolymer can be reduced by selecting a plurality of monomers of which respective signs of the intrinsic birefringence and the photoelastic coefficient are different from each other when polymerized into homopolymers, and polymerizing a combination of the selected monomers while adjusting the composition of the monomers. Lower glass transition temperatures of such copolymers, however, may restrict their applications to electronic devices, automobiles or the like which may experience increases in the internal temperatures.

Against this background, as resins suitable for injection molding having improved heat resistance as well as improved orientational birefringence, there have been proposed a copolymer produced by hydrogenating aromatic double bonds in a copolymer obtained by polymerizing a monomer composition containing a (meth)acryl acid ester monomer and an aromatic vinyl monomer (PTL 3), and a (meth)acryl based resin having a glutarimide unit having a cyclic structure in the main chain thereof (PTL 4). Although these resins have lower photoelastic coefficient, the orientational birefringence is not sufficiently low. Thus, the resins are disadvantageous in that an optical component produced from the resin may experience birefringence induced by a residual distortion generated during molding and a stress generated when the optical component is secured to a device.

Accordingly, there have been proposed a resin materials with high heat resistance which can provide injection molded pieces having reduced orientational birefringence and photoelasticity. Examples include a non-birefringence resin material composed of a composition containing a resin such as a glutarimide acrylic resin and a graft copolymer (PTL 5), and a methacrylic copolymer having a cyclic structure in the main chain thereof produced from a methacrylate monomer and two or more N-substituted maleimide monomers (PTL 6). However, applications of a composition containing a plurality of resins which are not completely compatible to each other, such as the one disclosed PTL 5, to optical components are restricted because of an increase in haze with an increase in as the thickness of a shaped article, resulting in reduced transparency. Further, the methacrylic resin of PTL 6 has low orientational birefringence and photoelastic coefficient when the methacrylic resin is molded into an injection molded shaped article. However, there is room for improvement in the birefringence in a case where the methacrylic resin is molded into a shaped article in a complicated shape, such as one with a varied thickness, e.g., a lens and a prism, or a thin shaped article, e.g., a light guide plate.

CITATION LIST

Patent Literature

PTL 1: JP 2006-308682 A
PTL 2: WO 2015/098980
PTL 3: JP 2008-15199 A
PTL 4: JP 2006-328330 A
PTL 5: WO 2015/098775
PTL 6: WO 2011/149088

SUMMARY

Technical Problem

The present disclosure is directed to provide a methacrylic resin which has a high heat resistance, exhibits a high level of control on the birefringence, and is suitable for injection molding applications, to a methacrylic resin shaped article containing this methacrylic resin, and to an optical component or an automotive part including this methacrylic resin shaped article.

Solution to Problem

Our extensive studies aiming at solving the above-mentioned problem of prior art have led to the finding that the orientational birefringence of a methacrylic resin having a cyclic structure in the main chain thereof does not exhibit a linear dependency on the degree of orientation. For example, even when the composition of the resin is adjusted so that the degree of orientation becomes zero at a certain degree of orientation, the orientational birefringence does not become zero when the degree of orientation has a different value. Furthermore, we have discovered that, for a resin material used for molding of an injection molded shaped article, particularly a shaped article in a complicated shape, such as one with a varied thickness, e.g., a lens and a prism, or a thin shaped article, e.g., a light guide plate, it is important to control the orientational birefringence at higher degrees of orientation than degrees of orientation which have been conventionally assumed in film applications. We have discovered that the above-mentioned problem could be solved by using a resin in which the sign of the orientational birefringence when the degree of orientation is low is different from the sign of the orientational birefringence when the degree of orientation is high.

Specifically, the present disclosure provides the following:

(1) A methacrylic resin,
the methacrylic resin having a cyclic structure in a main chain thereof,
the methacrylic resin having a glass transition temperature of higher than 120° C. and 160° C. or lower,
wherein a sign of an orientational birefringence when being oriented so as to have a degree of orientation of 0.03 is different from the sign of the orientational birefringence when being oriented so as to have a degree of orientation of 0.08.

(2) The methacrylic resin according to (1), wherein
an absolute value of the orientational birefringence when being oriented so as to have a degree of orientation of 0.03 is $0.1 \times 10^{-5}$ or more and $5.0 \times 10^{-5}$ or less, and
the absolute value of the orientational birefringence when being oriented so as to have a degree of orientation of 0.08 is $8.0 \times 10^{-5}$ or less.

(3) The methacrylic resin according to (1), wherein
the absolute value of the orientational birefringence when being oriented so as to have a degree of orientation of 0.03 is $0.1 \times 10^{-5}$ or more and $3.0 \times 10^{-5}$ or less, and
the absolute value of the orientational birefringence when being oriented so as to have a degree of orientation of 0.08 is $5.0 \times 10^{-5}$ or less.

(4) A methacrylic resin,
the methacrylic resin having a structural unit having a cyclic structure in the main chain thereof,
the methacrylic resin having a glass transition temperature of higher than 120° C. and 160° C. or lower,
wherein a difference in an abundance ratio of the structural unit having the cyclic structure in the main chain thereof is 3.0 mass % or less between a fraction component having a peak top molecular weight of 40,000 to 50,000 and a fraction component having a peak top molecular weight of 240,000 to 260,000, the fraction components being obtained through a molecular weight fractionation.

(5) The methacrylic resin according to (4), wherein
an absolute value of a difference between an absolute value of an orientational birefringence when being oriented so as to have a degree of orientation of 0.03 and the absolute value of the orientational birefringence when being oriented so as to have a degree of orientation of 0.08 is $5.0 \times 10^{-5}$ or less.

(6) The methacrylic resin according to (4) or (5), wherein
the absolute value of the orientational birefringence when being oriented so as to have a degree of orientation of 0.03 is $0.1 \times 10^{-5}$ or more and $5.0 \times 10^{-5}$ or less, and
the absolute value of the orientational birefringence when being oriented so as to have a degree of orientation of 0.08 is $8.0 \times 10^{-5}$ or less.

(7) The methacrylic resin according to any one of (1) to (6), wherein a yellowness index (YI) of a molded piece produced by injection molding the methacrylic resin measured in an optical path length of 80 mm is 20 or less.

(8) The methacrylic resin according to any one of (1) to (7), wherein the methacrylic resin has a photoelastic coefficient of $-3 \times 10^{-12}$ to $+3 \times 10^{-12}$ Pa$^{-1}$.

(9) The methacrylic resin according to any one of (1) to (8), wherein the methacrylic resin comprises an N-substituted maleimide monomer-derived structural unit.

(10) The methacrylic resin according to any one of (1) to (8), wherein the methacrylic resin comprises a glutarimide structural unit.

(11) A shaped article comprising the methacrylic resin according to any one of (1) to (10), or a methacrylic resin composition comprising the methacrylic resin according to any one of (1) to (10).

(12) The shaped article according to (11), wherein the shaped article has a thickness of 1.5 mm or less.

(13) An optical component or an automotive part comprising the shaped article according to (11) or (12).

Advantageous Effect

The present disclosure can provide a methacrylic resin which has a high heat resistance, exhibits a high level of control on the birefringence, and is suitable for injection molding applications, a shaped article containing this methacrylic resin, and an optical component or an automotive part including this shaped article.

BRIEF DESCRIPTION OF THE DRAWINGS

In the accompanying drawings:
FIG. 1 is a diagram illustrating a flat plate mold provided with a fan gate used in a measurement of the phase difference of each injection molded piece of examples. FIG. 1(A) is a plan view, and FIG. 1(B) is a cross-sectional view when being cut on the plane along the line A-A in FIG. 1(A).

DETAILED DESCRIPTION

The following provides a detailed description of an embodiment of the present disclosure (hereinafter, referred to as the "present embodiment"). This disclosure is not limited to the following description, but may be practiced in a wide variety of variations within the scope of the subject thereof.

(Methacrylic Resin)

A methacrylic resin according to the present embodiment is a methacrylic resin including a methacrylic acid ester monomer unit (A), and including a structural unit (B) having a cyclic structure in the main chain thereof. The structural unit (B) having a cyclic structure in the main chain thereof is selected from an N-substituted maleimide monomer-derived structural unit (B-1), a glutarimide structural unit (B-2), a lactone ring structural unit (B-3), and the like. Furthermore, the methacrylic resin optionally includes another vinyl monomer unit (C) copolymerizable with the methacrylic acid ester monomer.

The following provides a detailed description of each monomer structural unit.

—Methacrylic Acid Ester Monomer-Derived Structural Unit (A)—

First, the methacrylic acid ester monomer-derived structural unit (A) is described.

The methacrylic acid ester monomer-derived structural unit (A) is, for example, formed from a monomer selected from the following methacrylic acid esters.

Examples of methacrylic acid esters that can be used include methyl methacrylate, ethyl methacrylate, n-propyl methacrylate, isopropyl methacrylate, n-butyl methacrylate, isobutyl methacrylate, t-butyl methacrylate, 2-ethylhexyl methacrylate, cyclopentyl methacrylate, cyclohexyl methacrylate, cyclooctyl methacrylate, tricyclodecyl methacrylate, dicyclooctyl methacrylate, tricyclododecyl methacrylate, isobornyl methacrylate, phenyl methacrylate, benzyl methacrylate, 1-phenylethyl methacrylate, 2-phenoxyethyl methacrylate, 3-phenylpropyl methacrylate, and 2,4,6-tribromophenyl methacrylate.

One of these monomers may be used alone, or two or more of these monomers may be used in combination.

Among these methacrylic acid esters, methyl methacrylate and benzyl methacrylate are preferable in terms of providing the resultant methacrylic resin with excellent transparency and weather resistance.

The methacrylic resin may include only one type of methacrylic acid ester monomer-derived structural unit (A) or may include two or more types of methacrylic acid ester monomer-derived structural units.

The content of the methacrylic acid ester monomer-derived structural unit (A) is preferably 50 mass % to 97 mass %, more preferably 55 mass % to 97 mass %, even more preferably 55 mass % to 95 mass %, still more preferably 60 mass % to 93 mass %, and particularly preferably 60 mass % to 90 mass %, relative to 100 mass % of the methacrylic resin, from a viewpoint of imparting sufficient heat resistance to the methacrylic resin through a structural unit (B) having a cyclic structure in the main chain thereof, which will be described later.

Note that the content of the methacrylic acid ester monomer-derived structural unit (A) can be determined by $^1$H-NMR and $^{13}$C-NMR measurements. For example, $^1$H-NMR and $^{13}$C-NMR measurements can be made using $CDCl_3$ or $DMSO-d_6$ as a measurement solvent at a measurement temperature of 40° C.

The following provides a description of the structural unit (B) having a cyclic structure in the main chain thereof.

—Structural Unit (B) Having Cyclic Structure in the Main Chain Thereof—

—N-Substituted Maleimide Monomer-Derived Structural Unit (B-1)—

Next, an N-substituted maleimide monomer-derived structural unit (B-1) is described.

The N-substituted maleimide monomer-derived structural unit (B-1) may be formed from at least one selected from a monomer represented by the following formula (1) and/or a monomer represented by the following formula (2), and is preferably formed from both a monomer represented by the following formula (1) and a monomer represented by the following formula (2).

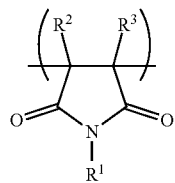

(1)

In formula (1), $R^1$ represents an arylalkyl group having a carbon number of 7 to 14 or an aryl group having a carbon number of 6 to 14, and $R^2$ and $R^3$ each represent, independently of one another, a hydrogen atom, an alkyl group having a carbon number of 1 to 12, or an aryl group having a carbon number of 6 to 14.

Note that in a case in which $R^2$ is an aryl group, $R^2$ may include a halogen as a substituent.

Moreover, $R^1$ may be substituted with a substituent such as a halogen atom, an alkyl group having carbon number of 1 to 6, an alkoxy group having a carbon number of 1 to 6, a nitro group, or a benzyl group.

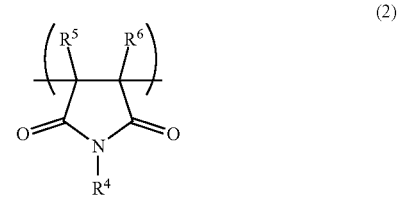

(2)

In formula (2), $R^4$ represents a hydrogen atom, a cycloalkyl group having a carbon number of 3 to 12, or an alkyl group having a carbon number of 1 to 12, and $R^5$ and $R^6$ each represent, independently of one another, a hydrogen atom, an alkyl group having a carbon number of 1 to 18, or an aryl group having a carbon number of 6 to 14.

Specific examples are listed below.

Examples of monomers represented by formula (1) include N-phenylmaleimide, N-benzylmaleimide, N-(2-chlorophenyl)maleimide, N-(4-chlorophenyl)maleimide, N-(4-bromophenyl)maleimide, N-(2-methylphenyl)maleimide, N-(2-ethylphenyl)maleimide, N-(2-methoxyphenyl)maleimide, N-(2-nitrophenyl)maleimide, N-(2,4,6-trimethylphenyl)maleimide, N-(4-benzylphenyl)maleimide, N-(2,4,6-tribromophenyl)maleimide, N-naphthylmaleimide, N-anthracenylmaleimide, 3-methyl-1-phenyl-1H-pyrrole-2,5-dione, 3,4-dimethyl-1-phenyl-1H-pyrrole-2,5-dione, 1,3-diphenyl-1H-pyrrole-2,5-dione, and 1,3,4-triphenyl-1H-pyrrole-2,5-dione.

Among these monomers, N-phenylmaleimide and N-benzylmaleimide are preferable in terms of providing the resultant methacrylic resin with excellent heat resistance and optical properties such as birefringence.

One of these monomers may be used alone, or two or more these monomers may be used in combination.

Examples of monomers represented by formula (2) include N-methylmaleimide, N-ethylmaleimide, N-n-propylmaleimide, N-isopropylmaleimide, N-n-butylmaleimide, N-isobutylmaleimide, N-s-butylmaleimide, N-t-butylmaleimide, N-n-pentylmaleimide, N-n-hexylmaleimide, N-n-heptylmaleimide, N-n-octylmaleimide, N-laurylmaleimide, N-stearylmaleimide, N-cyclopentylmaleimide, N-cyclohexylmaleimide, 1-cyclohexyl-3-methyl-1-phenyl-1H-pyrrole-2,5-dione, 1-cyclohexyl-3,4-dimethyl-1-phenyl-1H-pyrrole-2,5-dione, 1-cyclohexyl-3-phenyl-1H-pyrrole-2,5-dione, and 1-cyclohexyl-3,4-diphenyl-1H-pyrrole-2,5-dione.

Among these monomers, N-methylmaleimide, N-ethylmaleimide, N-isopropylmaleimide, and N-cyclohexylmaleimide are preferable in terms of providing the resultant methacrylic resin with excellent weather resistance, and N-cyclohexylmaleimide is particularly preferable in terms of providing excellent low water absorbency demanded of optical materials in recent years.

One of these monomers may be used alone, or two or more of these monomers may be used in combination.

The methacrylic resin according to the present embodiment is particularly preferably obtained using a monomer represented by formula (1) and a monomer represented by formula (2), in combination, in order to exhibit a high level of control on birefringence properties.

The content (B1) of a structural unit derived from the monomer represented by formula (1), in terms of a molar ratio (B1/B2) relative to the content (B2) of a structural unit derived from the monomer represented by formula (2), is preferably greater than 0 and no greater than 15, and more preferably greater than 0 and no greater than 10.

When the molar ratio (B1/B2) is within any of the ranges set forth above, the methacrylic resin shaped article according to the present embodiment can exhibit good heat resistance and good photoelastic properties while maintaining transparency, and without yellowing or loss of environmental resistance.

The content of the N-substituted maleimide monomer-derived structural unit (B-1) is not specifically limited so long as the resultant composition has a glass transition temperature satisfying the range according to the present embodiment. Nevertheless, the content of the N-substituted maleimide monomer-derived structural unit relative to 100 mass % of the methacrylic resin is preferably 5 mass % to 40 mass %, and more preferably 5 mass % to 35 mass %.

When the content of the N-substituted maleimide monomer-derived structural unit is within any of the ranges, a more adequate enhancement effect can be achieved with respect to heat resistance of the methacrylic resin shaped article, and a more preferable enhancement effect can also be achieved with respect to weather resistance, low water absorbency, and optical properties of the methacrylic resin shaped article. Restricting the content of the N-substituted maleimide monomer-derived structural unit to 40 mass % or less is effective for preventing a decrease in physical properties of the methacrylic resin shaped article caused by a large amount of monomer remaining unreacted due to reduced reactivity of monomer components in the polymerization reaction.

—Glutarimide-Based Structural Unit (B-2)—

The methacrylic resin including the glutarimide-based structural unit in the main chain thereof may, for example, be a methacrylic resin including a glutarimide-based structural unit described in JP 2006-249202 A, JP 2007-009182 A, JP 2007-009191 A, JP 2011-186482 A, or WO 2012/114718 A1, and may be formed by a method described in the same publication.

A glutarimide-based structural unit included in the methacrylic resin according to the present embodiment may be formed after resin polymerization.

Specifically, the glutarimide-based structural unit may be represented by the following general formula (3).

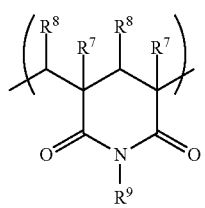

(3)

In general formula (3), it is preferable that $R^7$ and $R^8$ are each, independently of one another, hydrogen or a methyl group, and $R^9$ is hydrogen, a methyl group, a butyl group, or a cyclohexyl group, and more preferable that IC is a methyl group, $R^8$ is hydrogen, and $R^9$ is a methyl group.

The methacrylic resin may include a single type of glutarimide-based structural unit or may include two or more types of glutarimide-based structural units.

In the methacrylic resin that includes the glutarimide-based structural unit, the content of the glutarimide-based structural unit is not specifically limited so long as the preferable range for the glass transition temperature of a composition according to the present embodiment is satisfied. Nevertheless, the content of the glutarimide-based structural unit relative to 100 mass % of the methacrylic resin is preferably 5 mass % to 70 mass %, and more preferably 5 mass % to 60 mass %.

It is preferable for the content of the glutarimide-based structural unit to be within any of the ranges set forth above in terms that a resin having good molding properties, heat resistance, and optical properties can be obtained.

The methacrylic resin including the glutarimide-based structural unit may further include an aromatic vinyl monomer unit as necessary.

Examples of aromatic vinyl monomers that can be used include, but are not specifically limited to, styrene and α-methylstyrene. The aromatic vinyl monomer is preferably styrene.

The content of the aromatic vinyl unit in the methacrylic resin including the glutarimide-based structural unit is not specifically limited. Nevertheless, the content of the aromatic vinyl unit relative to 100 mass % of the methacrylic resin is preferably 0 mass % to 20 mass %.

It is preferable for the content of the aromatic vinyl unit to be in the range set forth above in terms that both heat resistance and excellent photoelastic properties can be obtained.

—Lactone Ring Structural Unit (B-3)—

The methacrylic resin including the lactone ring structural unit in the main chain thereof can be formed, for example, by a method described in JP 2001-151814 A, JP 2004-168882 A, JP 2005-146084 A, JP 2006-96960 A, JP 2006-171464 A, JP 2007-63541 A, JP 2007-297620 A, or JP 2010-180305 A.

A lactone ring structural unit included in the methacrylic resin according to the present embodiment may be formed after resin polymerization.

A lactone ring structural unit according to the present embodiment is preferably a six-membered ring since this provides the cyclic structure with excellent stability.

The lactone ring structural unit that is a six-membered ring is, for example, particularly preferably a structure represented by the following general formula (4).

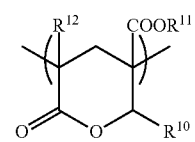

(4)

In general formula (4), $R^{10}$, $R^{11}$, and $R^{12}$ are each, independently of one another, a hydrogen atom or an organic residue having a carbon number of 1 to 20.

Examples of the organic residue include saturated aliphatic hydrocarbon groups (alkyl groups, etc.) having a carbon number of 1 to 20 such as a methyl group, an ethyl group, and a propyl group; unsaturated aliphatic hydrocarbon groups (alkenyl groups, etc.) having a carbon number of 2 to 20 such as an ethenyl group and a propenyl group; aromatic hydrocarbon groups (aryl groups, etc.) having a carbon number of 6 to 20 such as a phenyl group and a naphthyl group; and groups in which at least one hydrogen atom of any of these saturated aliphatic hydrocarbon groups, unsaturated aliphatic hydrocarbon groups, and aromatic hydrocarbon groups is substituted with at least one group selected from the group consisting of a hydroxy group, a carboxyl group, an ether group, and an ester group.

The lactone ring structure may be formed, for example, by copolymerizing an acrylic acid-based monomer having a hydroxy group and a methacrylic acid ester monomer such as methyl methacrylate to introduce a hydroxy group and an ester group or carboxyl group into the molecular chain, and then causing dealcoholization (esterification) or dehydration condensation (hereinafter, also referred to as a "cyclocondensation reaction") between the hydroxy group and the ester group or carboxyl group.

Examples of acrylic acid-based monomers having a hydroxy group that can be used in polymerization include 2-(hydroxymethyl)acrylic acid, 2-(hydroxyethyl)acrylic acid, alkyl 2-(hydroxymethyl)acrylates (for example, methyl 2-(hydroxymethyl)acrylate, ethyl 2-(hydroxymethyl)acrylate, isopropyl 2-(hydroxymethyl)acrylate, n-butyl 2-(hydroxymethyl)acrylate, and t-butyl 2-(hydroxymethyl)acrylate, and alkyl 2-(hydroxyethyl)acrylates. Moreover, 2-(hydroxymethyl)acrylic acid and alkyl 2-(hydroxymethyl) acrylates that are monomers having a hydroxyallyl moiety are preferable, and methyl 2-(hydroxymethyl)acrylate and ethyl 2-(hydroxymethyl)acrylate are particularly preferable.

No specific limitations are placed on the content of the lactone ring structural unit in the methacrylic resin including the lactone ring structural unit in the main chain thereof so long as the range for the glass transition temperature of the methacrylic resin according to the present embodiment is satisfied. Nevertheless, the content of the lactone ring structural unit relative to 100 mass % of the methacrylic resin is preferably 5 mass % to 40 mass %, and more preferably 5 mass % to 35 mass %.

When the content of the lactone ring structural unit is within any of the ranges set forth above, effects resulting from introduction of a cyclic structure, such as improved solvent resistance and improved surface hardness, can be exhibited while maintaining molding properties.

The content of the lactone ring structure in the methacrylic resin can be determined by a method described in the previously mentioned patent literature.

The content of the structural unit (B) having a cyclic structure in the main chain thereof is preferably 3 mass % to 40 mass % from a viewpoint of the heat resistance, thermal stability, strength, and fluidity of the methacrylic resin according to the present embodiment. The lower limit of the content is more preferably 5 mass % or more, even more preferably 7 mass % or more, still more preferably 8 mass % or more, and the upper limit of the content is more preferably 30 mass % or less, even more preferably 28 mass % or less, still more preferably 25 mass % or less, particularly preferably 20 mass % or less, particularly more preferably 18 mass % or less, and most preferably less than 15 mass %.

—Other Vinyl Monomer Unit (C) Copolymerizable with Methacrylic Acid Ester Monomer—

Examples of the other vinyl monomer unit (C) copolymerizable with a methacrylic acid ester monomer (hereinafter, also referred to as the "monomer unit (C)"), which may be included in the methacrylic resin according to the present embodiment, include an aromatic vinyl monomer unit (C-1), an acrylic acid ester monomer unit (C-2), a vinyl cyanide monomer unit (C-3), and a monomer unit (C-4) other than these monomers.

One type of other vinyl monomer unit (C) that is copolymerizable with a methacrylic acid ester monomer may be used alone, or two or more types of other vinyl monomer units (C) that are copolymerizable with a methacrylic acid ester monomer may be used in combination.

An appropriate material for the monomer unit (C) can be selected depending on the properties required of the methacrylic resin. Nevertheless, in a case in which properties such as thermal stability, fluidity, mechanical properties, and chemical resistance are particularly necessary, one or more selected from the group consisting of an aromatic vinyl monomer unit (C-1), an acrylic acid ester monomer unit (C-2), and a vinyl cyanide monomer unit (C-3) can be suitably used.

[Aromatic Vinyl Monomer Unit (C-1)]

Although no specific limitations are placed on monomers that can be used to form an aromatic vinyl monomer unit (C-1) included in the methacrylic resin according to the present embodiment, an aromatic vinyl monomer represented by the following general formula (5) is preferable.

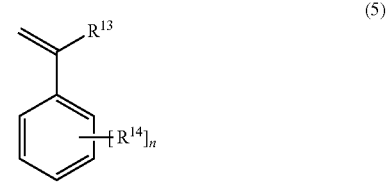

(5)

In general formula (5), $R^{13}$ represents a hydrogen atom or an alkyl group having a carbon number of 1 to 6. The alkyl group may, for example, be substituted with a hydroxy group.

$R^{14}$ is one selected from the group consisting of a hydrogen atom, an alkyl group having a carbon number of 1 to 12, an alkoxy group having a carbon number of 1 to 12, an aryl group having a carbon number of 6 to 8, and an aryloxy group having a carbon number of 6 to 8. Note that each $R^{14}$ may be the same group or a different group. Moreover, a cyclic structure may be formed by $R^{14}$ groups.

Moreover, n represents an integer of 0 to 5.

Specific examples of monomers represented by general formula (5) include, but are not specifically limited to, styrene, o-methylstyrene, m-methylstyrene, p-methylstyrene, 2,4-dimethylstyrene, 2,5-dimethylstyrene, 3,4-dimethylstyrene, 3,5-dimethylstyrene, p-ethylstyrene, m-ethylstyrene, o-ethylstyrene, p-tert-butylstyrene, 1-vinylnaphthalene, 2-vinylnaphthalene, 1,1-diphenylethylene, isopropenylbenzene(α-methylstyrene), isopropenyltoluene, isopropenylethylbenzene, isopropenylpropylbenzene, isopropenylbutylbenzene, isopropenylpentylbenzene, isopropenylhexylbenzene, isopropenyloctylbenzene, α-hydroxymethylstyrene, and α-hydroxyethyl styrene.

Among these examples, styrene and isopropenylbenzene are preferable, and styrene is more preferable from a viewpoint of imparting fluidity, reducing the amount of unreacted monomer through improvement of the polymerization conversion, and so forth.

The above examples may be selected as appropriate depending on the required properties of the methacrylic resin according to the present embodiment.

In a case in which the aromatic vinyl monomer unit (C-1) is used, the content thereof when the total amount of the monomer unit (A) and the structural unit (B) is taken to be 100 mass % is preferably 23 mass % or less, more preferably 20 mass % or less, even more preferably 18 mass % or less, further preferably 15 mass % or less, and even further preferably 10 mass % or less in view of the balance of heat resistance, residual monomer reduction, and fluidity.

In a case in which the aromatic vinyl monomer unit (C-1) is used together with the maleimide-based structural unit (B-1) described above, a ratio (mass ratio) of the content of the monomer unit (C-1) relative to the content of the structural unit (B-1) (i.e., (C-1) content/(B-1) content) is preferably 0.3 to 5 from a viewpoint of processing fluidity, an effect of reducing silver streak through reduction in residual monomers, and so forth.

From a viewpoint of maintaining good color tone and heat resistance, the upper limit for this ratio is preferably 5 or less, more preferably 3 or less, and even more preferably 1 or less. Moreover, from a viewpoint of reduction in residual monomers, the lower limit for this ratio is preferably 0.3 or more, and more preferably 0.4 or more.

One of such aromatic vinyl monomers (C-1) may be used alone, or two or more of aromatic vinyl monomers (C-1) may be used in combination.

[Acrylic Acid Ester Monomer Unit (C-2)]

Although no specific limitations are placed on monomers that can be used to form an acrylic acid ester monomer unit (C-2) included in the methacrylic resin according to the present embodiment, an acrylic acid ester monomer represented by the following general formula (6) is preferable.

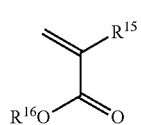

(6)

In general formula (6), $R^{15}$ represents a hydrogen atom or an alkoxy group having a carbon number of 1 to 12, and $R^{16}$ represents one of an alkyl group having a carbon number of 1 to 18, a cycloalkyl group having a carbon number of 3 to 12, and an aryl group having carbon number of 6 to 14.

The monomer used to form the acrylic acid ester monomer unit (C-2) is preferably methyl acrylate, ethyl acrylate, n-propyl acrylate, isopropyl acrylate, n-butyl acrylate, sec-butyl acrylate, 2-ethylhexyl acrylate, cyclohexyl acrylate, phenyl acrylate, or the like, and more preferably methyl acrylate, ethyl acrylate, or n-butyl acrylate from a viewpoint of increasing weathering resistance, heat resistance, fluidity, and thermal stability of the methacrylic resin according to the present embodiment for films, and is even more preferably methyl acrylate or ethyl acrylate from a viewpoint of high availability.

One type of acrylic acid ester monomer unit (C-2) may be used alone, or two or more types of acrylic acid ester monomer units (C-2) may be used in combination.

In a case in which an acrylic acid ester monomer unit (C-2) is used, the content thereof when the total amount of the monomer unit (A) and the structural unit (B) is taken to be 100 mass % is preferably 5 mass % or less, and more preferably 3 mass % or less from a viewpoint of heat resistance and thermal stability.

[Vinyl Cyanide Monomer Unit (C-3)]

Examples of monomers that may be used to form a vinyl cyanide monomer unit (C-3) included in the methacrylic resin according to the present embodiment include, but are not specifically limited to, acrylonitrile, methacrylonitrile, ethacrylonitrile, and vinylidene cyanide. Among these examples, acrylonitrile is preferable from a viewpoint of high availability and its capability of imparting chemical resistance.

One type of vinyl cyanide monomer unit (C-3) may be used alone, or two or more types of vinyl cyanide monomer units (C-3) may be used in combination.

In a case in which a vinyl cyanide monomer unit (C-3) is used, the content thereof when the total amount of the monomer unit (A) and the structural unit (B) is taken to be 100 mass % is preferably 15 mass % or less, more preferably 12 mass % or less, and even more preferably 10 mass % or less from a viewpoint of solvent resistance and retention of heat resistance.

[Monomer Unit (C-4) Other than (C-1) to (C-3)]

The monomer forming the monomer unit (C-4) other than (C-1) to (C-3) included in the methacrylic resin according to the present embodiment is not particularly limited, and examples thereof include, for example, amides such as acrylamide and methacrylamide; glycidyl compounds such as glycidyl (meth)acrylate and allyl glycidyl ether; unsaturated carboxylic acids such as acrylic acid, methacrylic acid, itaconic acid, maleic acid, and fumaric acid, and half-esterified products or anhydrides thereof; unsaturated alcohols such as methallyl alcohol and allyl alcohol; olefins such as ethylene, propylene, and 4-methyl-1-pentene; and other vinyl compounds or vinylidene compounds other than those mentioned above such as vinyl acetate, 2-hydroxymethyl-1-butene, methyl vinyl ketone, N-vinylpyrrolidone, and N-vinylcarbazole.

Further, examples of a crosslinkable compounds having a plurality of reactive double bonds include products obtained through esterification of both end hydroxy groups of an ethylene glycol or an oligomer thereof with an acrylic acid or a methacrylic acid, such as ethylene glycol di(meth)acrylate, diethylene glycol di(meth)acrylate, triethylene glycol di(meth)acrylate, and tetraethylene glycol di(meth)acrylate; products obtained through esterification of hydroxy groups in two alcohols with an acrylic acid or a methacrylic acid such as neopentyl glycol di(meth)acrylate and di(meth)acrylate; products obtained through esterification of polyhydric alcohol derivatives such as trimethylol propane and pentaerythritol with an acrylic acid or a methacrylic acid; and polyfunctional monomers such as divinylbenzene.

Among the monomers described above that may be used to form the monomer unit (C), at least one selected from the group consisting of methyl acrylate, ethyl acrylate, styrene, and acrylonitrile is preferable from a viewpoint of high availability.

The content of the other vinyl monomer unit (C) that is copolymerizable with a methacrylic acid ester monomer when the amount of the methacrylic resin is taken to be 100 mass % is 0 mass % to 20 mass %, preferably 0 mass % to 18 mass %, and more preferably 0 mass % to 15 mass % from a viewpoint of increasing the effect of imparting heat resistance by the structural unit (B).

Particularly in a case in which a crosslinkable polyfunctional (meth)acrylate having a plurality of reactive double bonds is used for the monomer unit (C), the content of the monomer unit (C) is preferably 0.5 mass % or less, more preferably 0.3 mass % or less, and even more preferably 0.2 mass % or less from a viewpoint of fluidity of the polymer.

In the present embodiment, the content of the structural unit (B) when the total amount of the structural unit (B) and the monomer unit (C) is taken to be 100 mass % is preferably 45 mass % to 100 mass % from a viewpoint of heat resistance and optical properties of the methacrylic resin shaped article. In this case, the content of the structural unit (C) is 0 mass % to 55 mass %. Moreover, the content of the structural unit (B) in this case is preferably 50 mass % to 100 mass %, more preferably 50 mass % to 90 mass %, and even more preferably 50 mass % to 80 mass %.

The following describes properties of the methacrylic resin according to the present embodiment.

The glass transition temperature (Tg) of the methacrylic resin according to the present embodiment is higher than 120° C. and 160° C. or lower.

When the glass transition temperature (Tg) of the methacrylic resin is higher than 120° C., the heat resistance required in recent years for optical components such as lens shaped articles, automotive parts such as in-vehicle displays, and film shaped articles and optical films for liquid-crystal displays can be more easily obtained. The glass transition temperature (Tg) is more preferably 125° C. or higher and even more preferably 130° C. or higher from a viewpoint of the dimensional stability at temperatures in the environment of use.

On the other hand, when the glass transition temperature (Tg) of the methacrylic resin is 160° C. or lower, melt processing at an extremely high temperatures can be avoided to thereby reduce thermal decomposition of the resin or the like, enabling provision of favorable products. The glass transition temperature (Tg) is preferably 150° C. or lower for the above-mentioned reasons.

Note that the glass transition temperature (Tg) can be determined by making measurements in accordance with JIS-K7121. Specifically, measurement can be performed using a method described in the EXAMPLES section below.

In the methacrylic resin having a cyclic structure in the main chain thereof according to the present embodiment, the sign of the orientational birefringence when being oriented so as to have a degree of orientation of 0.03 is different from the sign of the orientational birefringence when being oriented so as to have a degree of orientation of 0.08.

Further, the absolute value of the orientational birefringence when being oriented so as to have a degree of orientation of 0.03 is preferably $0.1 \times 10^{-5}$ or more and $5.0 \times 10^{-5}$ or less, more preferably $0.1 \times 10^{-5}$ or more and $3.0 \times 10^{-5}$ or less, even more preferably $0.3 \times 10^{-5}$ or more and $2.0 \times 10^{-5}$ or less, and still more preferably $0.5 \times 10^{-5}$ or more and $1.5 \times 10^{-5}$ or less.

Further, the absolute value of the orientational birefringence when being oriented so as to have a degree of orientation of 0.08 is preferably $8.0 \times 10^{-5}$ or less, more preferably $5.0 \times 10^{-5}$ or less, even more preferably $0.1 \times 10^{-5}$ or more and $4.0 \times 10^{-5}$ or less, and still more preferably $0.3 \times 10^{-5}$ or more and $3.0 \times 10^{-5}$ or less.

Further, the difference between the absolute value of the orientational birefringence when being oriented so as to have a degree of orientation of 0.03 and the absolute value of the orientational birefringence when being oriented so as to have a degree of orientation of 0.08 is preferably $5.0 \times 10^{-5}$ or less, more preferably $4.0 \times 10^{-5}$ or less, even more preferably $3.0 \times 10^{-5}$ or less, still more preferably $2.0 \times 10^{-5}$ or less, and still even more preferably $1.0 \times 10^{-5}$ or less.

The orientational birefringence of the methacrylic resin can, more specifically, be determined by a method described in the EXAMPLES section below.

For example, the resin having an orientational birefringence when being oriented so as to have a degree of orientation of 0.03 of $0.4 \times 10^{-5}$, and an orientational birefringence when being oriented so as to have a degree of orientation of 0.08 of $-2.4 \times 10^{-5}$ is technically equivalent to the resin having an orientational birefringence when being oriented so as to have a degree of orientation of 0.03 of $-0.4 \times 10^{-5}$, and an orientational birefringence when being oriented so as to have a degree of orientation of 0.08 of $2.4 \times 10^{-5}$, in that the in-plane birefringence of the resins molded into molded bodies can be offset by the profile of the degree of orientation in the thickness direction.

The birefringence Δn is defined as follows:

$$\Delta n = nx - ny \tag{a}$$

where nx represents the refractive index in the stretching direction, and ny is the refractive index in the direction orthogonal to the stretching direction; Δn assumes a positive value when nx is greater than ny whereas the Δn assumes a negative value when nx is smaller than ny.

Suppose that the intrinsic birefringence is represented by $\Delta n^0$ and the degree of orientation is represented by f, the orientational birefringence $\Delta n^{or}$ is expressed by the following equation.

$$\Delta n^{or} = f \times \Delta n^0 \tag{b}$$

Here, the degree of orientation f is an indicator representing the degree of orientation of the polymer main chain, and f becomes 1 when the polymer is completely oriented in a single direction. The orientational birefringence in this case corresponds to the intrinsic birefringence $\Delta n^0$. The degree of orientation f can be determined through a measurement of the infrared dichroic ratio.

The infrared dichroic ratio D is measured as follows. A methacrylic resin is formed into a film, which is then stretched. The absorbances $A_{\parallel}$ and $A_{\perp}$ of the stretched film are measured by irradiating the film with infrared light which is polarized in the direction horizontal and vertical to the stretching direction, respectively. The infrared dichroic ratio D is represented by the following formula.

$$D = A_{\parallel}/A_{\perp} \tag{c}$$

Suppose that the angle formed by the direction of the transition moment of the oscillation of the absorption of the functional group of interest and the direction in which the main chain is oriented or extends is represented by α, the degree of orientation f can be represented by the following formula.

$$f = \frac{D-1}{D+2} \times \frac{2\cot^2 a + 2}{2\cot^2 a - 1} \tag{d}$$

In a case where the methacrylic acid ester unit is methyl methacrylate, the degree of orientation of the methacrylic resin according to the present embodiment is determined from the absorption at a wave number of 750 cm$^{-1}$ corresponding to the rocking vibration of CH$_2$ in the methyl methacrylate unit, and α of 17°. The degree of orientation can also be determined from α of 90° using the absorbance at 1388 cm$^{-1}$ corresponding to the symmetric bending vibration of an α-methyl.

We have been made an attempt to reduce the birefringence of a methacrylic resin having a cyclic structure by reducing both the intrinsic birefringence which is a measure of the orientational birefringence and a photoelastic coefficient which is a measure of the photoelastic birefringence close to zero in injection molded shaped articles which are thicker and have higher degrees of orientation and have higher levels of demand for reducing the birefringence than films of conventional use.

Through this process, our endeavor to seek for a resin material exhibiting a lower orientational birefringence in a broader range of higher degree of orientation has led to the finding that the birefringence of a methacrylic resin having a cyclic structure does not exhibit a linear dependency on the degree of orientation. For example, even when the composition of a methacrylic resin having a cyclic structure is adjusted so that the orientational birefringence of the methacrylic resin becomes zero at a low degree of orientation, the orientational birefringence does not become zero at a high degree of orientation.

This means that the birefringence of an injection molded shaped article in which the degree of orientation has a profile inside the molded body cannot be eliminated completely by the conventional method for reducing the orientational birefringence and the photoelastic birefringence of a copolymer by selecting a plurality of monomers of which respective signs of the intrinsic birefringence and the photoelastic coefficient are different from each other when polymerized into homopolymers, and polymerizing a combination of the selected monomers while adjusting the composition of the monomers.

The reason why the orientational birefringence of a methacrylic resin having a cyclic structure exhibits the dependency on the degree of orientation is unclear. It is hypothesized that the mobility of methacrylic comonomer units is different from the mobility of comonomer units having a cyclic structure when an external force is applied. As a result, the comonomer units having high mobility move when the low degree of orientation is low. As the degree of orientation increases, the comonomer units having low mobility become capable of moving. In this manner, in the microscopic scale, comonomer units with a low degree of orientation are oriented differently from comonomer units with a high degree of orientation.

Based on this finding, we have discovered that the orientational birefringence can be canceled in an injection molded shaped article to thereby reduce the birefringence of the injection molded shaped article by preparing a copolymer in which the sign of the intrinsic birefringence at the degree of orientation corresponding to the location with a low degree of orientation near the center of the injection molded body in the thickness direction is made to be different from the sign of the intrinsic birefringence at the degree of orientation corresponding to the location with a high degree of orientation which is located slightly inward from the surface.

The optimum value of the orientational birefringence varies depending on the shape of an injection molded shaped article. Nevertheless, it is preferable that the absolute value of the orientational birefringence when being oriented so as to have a degree of orientation of 0.03 is $0.1 \times 10^{-5}$ or more and $5.0 \times 10^{-5}$ or less, and the absolute value of the orientational birefringence when being oriented so as to have a degree of orientation of 0.08 is $8.0 \times 10^{-5}$ or less, because an injection molded shaped article with a low birefringence can be fabricated, particularly in a thin shaped article having a thickness of 1.5 mm or less or an injection molded shaped article in a complicated shape, such as one with a varied thickness.

The absolute value of the photoelastic coefficient $C_R$ of the methacrylic resin according to the present embodiment including the structural unit having a cyclic structure in the main chain thereof is preferably $3.0 \times 10^{-12}$ Pa$^{-1}$ or less, more preferably $2.0 \times 10^{-12}$ Pa$^{-1}$ or less, and even more preferably $1.0 \times 10^{-12}$ Pa$^{-1}$ or less.

The photoelastic coefficient is described in various documents (see, for example, Review of Chemistry, No. 39, 1998 (published by Publishing Center of the Chemical Society of Japan)), and can be defined by the following formulae (e) and (f). The closer the value of the photoelastic coefficient $C_R$ to zero, the smaller the change in birefringence caused by external force becomes.

$$C_R = \Delta n / \sigma_R \tag{e}$$

$$\Delta n = nx - ny \tag{f}$$

(In the formula, $C_R$ is the photoelastic coefficient; $\sigma_R$ is the tensile stress; $\Delta n$ is the birefringence; nx is the refractive index in the stretching direction; and ny is the refractive index in a direction in the plane orthogonal to the stretching direction.)

When the absolute value of the photoelastic coefficient $C_R$ of the methacrylic resin according to the present embodiment is $3.0 \times 10^{-12}$ Pa$^{-1}$ or less, the birefringence caused by the residual stress generated during injection molding and a stress generated when an injection molded shaped article is attached as a part to a product can be sufficiently reduced.

The photoelastic coefficient $C_R$ of the methacrylic resin can, more specifically, be determined by a method described in the EXAMPLES section below.

The methacrylic resin according to the present embodiment has a weight average molecular weight (Mw) as measured by gel permeation chromatography (GPC) as a polymethyl methacrylate-converted value preferably in the range of 65,000 to 220,000, more preferably in the range of 80,000 to 180,000, and even preferably in the range of 90,000 to 150,000.

When the weight average molecular weight (Mw) is within one of the above ranges, an excellent balance of the mechanical strength and the fluidity can be achieved.

Further, with regard to the ratios among the Z-average molecular weight (Mz), the weight average molecular weight (Mw), and the number average molecular weight (Mn) as parameters indicating the molecular weight distribution of the methacrylic resin according to the present embodiment, Mw/Mn is preferably 1.5 to 3.0, more preferably 1.6 to 2.5, and even more preferably 1.6 to 2.3; and Mz/Mw is preferably 1.3 to 2.0, more preferably 1.3 to 1.8, and even more preferably 1.4 to 1.7, in view of the balance between the fluidity and the mechanical strength.

Note that the weight average molecular weight and the number average molecular weight of the methacrylic resin can be measured by the method described in the EXAMPLES section below.

A methacrylic resin including a structural unit having a cyclic structure which has characteristics in that the sign of the orientational birefringence when being oriented so as to have a degree of orientation of 0.03 is different from the sign of the orientational birefringence when being oriented so as to have a degree of orientation of 0.08, and the absolute value of the orientational birefringence when being oriented so as to have a degree of orientation of 0.03 is $0.1 \times 10^{-5}$ or more and $5.0 \times 10^{-5}$ or less, and the absolute value of the orientational birefringence when being oriented so as to have a degree of orientation of 0.08 is $8.0 \times 10^{-5}$ or less, tends to have a uniform composition distribution of cyclic structures in the methacrylic resin.

The composition distribution of cyclic structures in the methacrylic resin can be determined by observing the molecular weight dependence of the composition ratio of the structural unit having a cyclic structure in the methacrylic resin, and specifically is obtained by determining the abundance ratio of the structural unit having a cyclic structure in each component obtained by fractionating the methacrylic resin through preparative GPC. When the abundance ratio of the structural unit having a cyclic structure in the methacrylic resin content obtained through a molecular weight fractionation is expressed by mass %, the difference in the abundance ratio of the structural unit having a cyclic structure between the fraction component having a peak top molecular weight of 40,000 to 50,000 and the fraction component having a peak top molecular weight of 240,000 to 260,000 is preferably 3.0 mass % or less, more preferably 2.5 mass % or less, even more preferably 2.0 mass % or less, and still more preferably 1.5 mass % or less. Here, the fraction component having a peak top molecular weight of 40,000 to 50,000 refers to an arbitrary fraction component having a peak top molecular weight within this range, and the fraction component having a peak top molecular weight of 240,000 to 260,000 refers to an arbitrary fraction component having a peak top molecular weight within this range.

Note that the method for a molecular weight fractionation of the methacrylic resin is described in EXAMPLES section below, and the abundance ratio of the structural unit having a cyclic structure in each of the fractionated components can be measured by the method described in the EXAMPLES section below.

Further, a methacrylic resin which can be molded into an injection molded shaped article having a low birefringence can be produced by adjusting the composition of a structural unit having a cyclic structure in the methacrylic resin so that the absolute value of the difference between the absolute value of the orientational birefringence when being oriented so as to have a degree of orientation of 0.03 and the absolute value of the orientational birefringence when being oriented so as to have a degree of orientation of 0.08 is $5.0 \times 10^{-5}$ or less.

The sign of the orientational birefringence when the degree of orientation is low can be made to be different from the sign of the orientational birefringence when the degree of orientation is high, and the values of orientational birefringence can be reduced by reducing the deviation in the composition of the structural unit having a cyclic structure among the components having different molecular weights of the methacrylic resin, and by setting the composition of the structural unit having a cyclic structure in the methacrylic resin as a whole to an appropriate value. The exact reason why such controls are possible has not been clarified yet, but the following reasons can be hypothesized. More specifically, structural units having a cyclic structure which have the sign of the birefringence opposite to the sign of the birefringence of methacrylic acid ester monomer units generally have lower motility in the molecular chains. Accordingly, if there is a deviation in the bonding composition of the structural unit having a cyclic structure, the molecular chains to which a lot of methacrylic acid ester monomers are bonded are preferentially oriented under an external stress. As a result, the orientational birefringence increases in a single direction, which hiders the orientational birefringence to have a value of the different sign depending on the degree of orientation. It is also considered that low molecular weight components orient differently from high molecular weight components due to flows during molding. It may be considered that the difference in the orientational birefringence caused by the difference in the degree of orientation can be reduced by reducing the composition distribution of cyclic structures.

The yellowness index (YI) of an optical path length of 80 mm of an injection molded piece of the methacrylic resin including a structural unit having a cyclic structure in the main chain thereof according to the present embodiment is preferably 20 or less, more preferably 18 or less, even more preferably 16 or less, and still more preferably 15 or less.

When the yellowness index of the methacrylic resin of the present embodiment resin is within one of the ranges set forth above, a shaped article which is excellent in color tone can be produced.

Note that the yellowness index (YI) can be measured by the method described in the EXAMPLES section below.

(Method of Producing Methacrylic Resin)

The following describes a method of producing the methacrylic resin according to the present embodiment.

In the production method according to the present embodiment, a batch, semi-batch, or continuous process can be employed for polymerization. Here, a batch process is a process in which a polymerization reaction is initiated after all raw materials are fed into a reactor, and a product is collected after completion of the polymerization. A semi-batch process is a process in which raw materials are fed or a product is collected while a reaction proceeds. A continuous process is a process in which raw materials are fed and a product is collected while a reaction proceeds. The method of producing the methacrylic resin having a cyclic structure in the main chain thereof according to the present embodiment preferably employs a semi-batch process in which a portion of raw materials is fed after the reaction is initiated from a viewpoint of enabling precise control on the copolymer composition.

The continuous process is not preferable as the production method according to the present embodiment for the following reasons. The continuous process is advantageous in that the difference in the monomer compositions among fractions with different molecular weights in the methacrylic resin can be reduced when a polymerization reaction is carried out in a single complete mixing reactor. However, unreacted monomers would remain in a large amount after polymerization, which tends to adversely affect the color tone. The amount of unreacted monomers, on the other hand, can be reduced by using a plug flow reactor. However, the difference in monomer compositions among fractions with different molecular weights in the methacrylic resin tends to increase. In a case where a plurality of complete mixing reactors are used or a combination of a complete mixing reactor and a plug flow reactor connected in series is used, the amount of unreacted monomers can also be reduced. However, the difference in monomer compositions among the fractions with different molecular weights tends to increase.

In the method of producing the methacrylic resin according to the present embodiment, monomers are polymerized by radical polymerization.

The following provides a detailed description of a method of producing a methacrylic resin containing an N-substituted maleimide-based structural unit (B-1) as the structural unit (B) having a cyclic structure in the main chain thereof.

The following provides a specific description of production by radical polymerization in the semi-batch process using solution polymerization as one example of a method of producing the methacrylic resin including an N-substituted maleimide monomer-derived structural unit (hereinafter, also referred to as a "maleimide copolymer").

No specific limitations are placed on the polymerization solvent that is used so long as the solubility of the maleimide copolymer obtained through polymerization is high and an appropriate reaction liquid viscosity can be maintained in order to prevent gelation or the like.

Specific examples of polymerization solvents that can be used include aromatic hydrocarbons such as toluene, xylene, ethylbenzene, and isopropylbenzene; ketones such as methyl isobutyl ketone, butyl CELLOSOLVE, methyl ethyl ketone, and cyclohexanone; and polar solvents such as dimethylformamide and 2-methylpyrrolidone.

Moreover, an alcohol such as methanol, ethanol, or isopropanol may be used in combination as the polymerization solvent to the extent that dissolution of the polymerized product during polymerization is not impaired.

No specific limitations are placed on the amount of solvent used in polymerization so long as polymerization proceeds, precipitation of the copolymer or used monomers does not occur in production, and the solvent can be easily removed. For example, when the total amount of used monomers is taken to be 100 parts by mass, the amount of the solvent is preferably 10 parts by mass to 200 parts by mass. The amount of the solvent is more preferably 25 parts by mass to 200 parts by mass, even more preferably 50 parts by mass to 200 parts by mass, and still more preferably 50 parts by mass to 150 parts by mass.

Although no specific limitations are placed on the polymerization temperature other than being a temperature at which polymerization proceeds, the polymerization temperature is preferably 70° C. to 180° C., and more preferably 80° C. to 160° C. The polymerization temperature is even more preferably 90° C. to 150° C., and still more preferably 100° C. to 150° C. The polymerization temperature is preferably 70° C. or higher from a viewpoint of the productivity, and is preferably 180° C. or lower for reducing side reactions during polymerization to thereby obtain a polymer having a desired molecular weight and quality.

Although no specific limitations are placed on the polymerization time other than being a time that enables the required degree of polymerization to be obtained with the required conversion, the polymerization time is preferably 2 hours to 15 hours, more preferably 3 hour to 12 hours, and even more preferably 4 hour to 10 hours, from a viewpoint of productivity and so forth.

The polymerization conversion at the end of polymerization of a methacrylic resin having an N-substituted maleimide monomer-derived structural unit in the main chain according to the present embodiment is preferably 93% to 99.9%, more preferably 95% to 99.9%, and even more preferably 97% to 99.8%

Here, the polymerization conversion is a proportion of the value determined by subtracting the total mass of monomers remaining at the end of polymerization from the total mass of monomers added to the polymerization system, relative to the total mass of the monomers added to the polymerization system.

Further, the amount of the N-substituted maleimide monomer remaining in the solution after polymerization (the amount of residual N-substituted maleimide) is preferably 50 mass ppm to 5000 mass ppm, more preferably 100 mass ppm to 3000 mass ppm, and even more preferably 200 mass ppm to 1000 mass ppm.

The higher polymerization conversion and the smaller the amount of residual N-substituted maleimide, the smaller the amount of monomers fed to the solvent recovery system becomes. Thus, the load on a purification system is reduced, and the prime cost decreases, which is economical. Nevertheless, if the polymerization conversion is excessively high or the amount of the residual N-substituted maleimide is excessively reduced, the amount of low molecular weight components causing coloring increases, which may adversely affect the color tone and the shaping processability.

In the polymerization reaction, polymerization may be performed with addition of a polymerization initiator and/or a chain transfer agent as necessary.

The polymerization initiator may be any initiator commonly used in radical polymerization and examples thereof include organic peroxides such as cumene hydroperoxide, diisopropylbenzene hydroperoxide, di-t-butyl peroxide, lauroyl peroxide, benzoyl peroxide, t-butylperoxy isopropyl carbonate, t-amyl peroxy-2-ethylhexanoate, t-amyl peroxyisononanoate, and 1,1-di(t-butylperoxy)cyclohexane; and azo compounds such as 2,2'-azobis(isobutyronitrile), 1,1'-azobis(cyclohexanecarbonitrile), 2,2'-azobis(2,4-dimethylvaleronitrile), and dimethyl-2,2'-azobisisobutyrate.

One of these polymerization initiators may be used alone, or two or more of these polymerization initiators may be used in combination.

These polymerization initiators may be added at any stage so long as the polymerization reaction is in progress.

The amount of the polymerization initiator added when the total amount of monomers used in polymerization is taken to be 100 parts by mass may be 0.01 parts by mass to 1 part by mass, and is preferably 0.05 parts by mass to 0.5 parts by mass.

The chain transfer agent may be a chain transfer agent that is commonly used in radical polymerization and examples thereof include mercaptan compounds such as n-butyl mercaptan, n-octyl mercaptan, n-decyl mercaptan, n-dodecyl mercaptan, and 2-ethylhexyl thioglycolate; halogen compounds such as carbon tetrachloride, methylene chloride, and bromoform; and unsaturated hydrocarbon compounds such as α-methylstyrene dimer, α-terpinene, dipentene, and terpinolene.

One of these chain transfer agents may be used alone, or two or more of these chain transfer agents may be used in combination.

These chain transfer agents may be added at any stage, without any specific limitations, so long as the polymerization reaction is in progress.

The amount of the chain transfer agent added when the total amount of monomers used in polymerization is taken to be 100 parts by mass may be 0.01 parts by mass to 1 part by mass, and is preferably 0.05 parts by mass to 0.5 parts by mass.

In solution polymerization, it is important to reduce the concentration of dissolved oxygen in the polymerization solution as much as possible in advance. For example, the concentration of dissolved oxygen is preferably 10 ppm or less.

The concentration of dissolved oxygen can be measured, for example, using a dissolved oxygen (DO) meter B-505 (produced by Iijima Electronics Corporation).

The method by which the concentration of dissolved oxygen is reduced may be selected as appropriate from methods such as a method in which an inert gas is bubbled into the polymerization solution; a method in which an operation of pressurizing the inside of a vessel containing the polymerization solution to approximately 0.2 MPa with an inert gas and then releasing the pressure is repeated prior to polymerization; and a method in which an inert gas is passed through a vessel containing the polymerization solution.

In order to achieve a desired orientational birefringence at a particular degree of orientation by controlling the distribution of cyclic structures in a methacrylic resin having an N-substituted maleimide monomer-derived cyclic structural unit according to the present embodiment during polymerization of the methacrylic resin, the copolymer composition distribution in the copolymer is preferably reduced.

In typical radical polymerization, the radical concentration and the monomer concentration in the system vary from the start and the end of polymerization. This results in differences in the average molecular weight of the polymer produced in each point in time of polymerization. On the other hand, methacrylic acid ester monomers generally have a high monomer reactivity ratio when copolymerized with an N-substituted maleimide, and tend to polymerize faster. As a result, when the final product copolymer is fractionated according to the molecular weight, the ratios of monomer units in the copolymer vary among fractions. By reducing the deviation of the monomer composition in copolymers having different molecular weights, the difference in the orientational birefringence between low and high degrees of orientation can be reduced. Further, by controlling the entire copolymer composition, the sign of the orientational birefringence when the degree of orientation is 0.03 and the sign of the orientational birefringence when the degree of orientation is 0.08, which are determined for the methacrylic resin including a structural unit having a cyclic structure in the main chain thereof according to the present embodiment, can be made different from each other, and preferably, the absolute value of the orientational birefringence when the degree of orientation is 0.03 can be set to $0.1 \times 10^{-5}$ or more and $5.0 \times 10^{-5}$ or less and the absolute value of the orientational birefringence when the degree of orientation is 0.08 can be set to $8.0 \times 10^{-5}$ or less.

For reducing the deviation of the monomer composition of copolymers having different molecular weights, polymerization is preferably carried out while a part of monomer unit is subsequently added so that the monomer composition in the polymerization system during polymerization becomes as uniform as possible.

For example, in at least a point in time when 60% to 70% of the total amount of the methacrylic acid ester monomer added to the polymerization system is consumed, the type and amount of the monomers to be added and the timing of the addition are adjusted so that the difference in the consumption rate between the methacrylic acid ester monomer and each of other monomers added to the polymerization system becomes preferably 10% or less, more preferably 5% or less, and even more preferably 3% or less.

Note that the consumption rate of a certain monomer at the point in time refers to the proportion of the amount of the monomer consumed in the polymerization reaction to the total amount of that monomer to be added, and the "total amount of that monomer to be added" includes the amount of the monomer that has been already added, as well as the amount of the monomer that will be added but has not been added yet.

Further, polymerization is carried out so that the difference in the final conversion between each of monomers added to the polymerization system at the end of the polymerization is preferably 10% or less, more preferably 5% or less, and even more preferably 3% or less.

Further, the final conversion of the N-substituted maleimide monomer is preferably 97% or more, more preferably 98% or more, even more preferably 99% or more, and still more preferably 99.2% or more. When the final conversion is one of the ranges set forth above, a methacrylic resin that is excellent in color tone can be obtained.

No specific limitations are placed on the method by which a polymerized product is collected from the polymerization solution obtained through solution polymerization. Examples of methods that can be adopted include a method in which the polymerization solution is added into an excess of a poor solvent in which the polymerized product obtained through polymerization does not dissolve, such as a hydrocarbon solvent or an alcohol solvent, treatment (emulsifying dispersion) is subsequently performed using a homogenizer, and unreacted monomers are separated from the polymerization solution by pre-treatment such as liquid-liquid extraction or solid-liquid extraction; and a method in which the polymerization solvent and unreacted monomers are separated by a step referred to as a devolatilization step to collect the polymerized product.

The devolatilization step is a step in which volatile contents such as the polymerization solvent, residual monomers, and reaction by-products are removed under heated vacuum conditions.

Examples of devices that can be used in the devolatilization step include devolatilization devices comprising a tubular heat exchanger and a devolatilization tank; thin film evaporators such as WIPRENE and EXEVA produced by Kobelco Eco-Solutions Co., Ltd., and Kontro and Diagonal-Blade Kontro produced by Hitachi, Ltd.; and vented extruders having sufficient residence time and surface area for exhibiting devolatilization capability.

Moreover, it is possible to adopt a devolatilization step or the like in which a devolatilization device that is a combination of two or more of these devices is used.

From a viewpoint of improving the color tone, it is preferable to use a devolatilization device having a heat exchanger and a decompression vessel as main components thereof without any rotating part in the structure thereof.

Specifically, it is possible to employ a devolatilization device which is configured from a devolatilization tank in a configuration where a decompression unit is attached to a decompression vessel which is sized to be suitable for devolatilization and is provided with a heat exchanger disposed in the upper part thereof, and a discharge device such as a gear pump for discharging a polymerized product after devolatilization.

In this devolatilization device, a polymerization solution is preheated by feeding it to the heat exchanger such as a multi-tube heat exchanger, a plate-fin heat exchanger, and a flat plate heat exchanger having a flat plate channel and a heater, disposed in the upper part of the decompression vessel, and then is fed to the devolatilization tank that is heated under a reduced pressure to separate the copolymer from the polymerization solvent, the mixture of unreacted raw materials, polymerization by-products, and the like. A devolatilization device which does not have any rotating part as described above is preferably used because a methacrylic resin having a good color tone can be obtained The treatment temperature in the devolatilization device is preferably 150° C. to 350° C., more preferably 170° C. to 300° C., and even more preferably 200° C. to 280° C. Residual volatile contents can be reduced by setting the treatment temperature to be equal to or higher than the lower limit temperature. Coloring and decomposition of the resultant acrylic resin can be prevented by setting the treatment temperature to be equal to or lower than the upper limit temperature.

The degree of vacuum in the devolatilization device may be 10 Torr to 500 Torr, and is, in particular, preferably 10 Torr to 300 Torr. Residual volatile content can be reduced by setting the degree of vacuum to be equal to or lower than the upper limit. In addition, the degree of vacuum equal to or higher than the lower limit is industrially practical.

The treatment time is selected as appropriate depending on the amount of residual volatile contents, and is preferably as short as possible in order to inhibit coloring or decomposition of the resultant acrylic resin.

The polymerized product collected through the devolatilization step is pelletized in a step referred to as a pelletization step.

In the pelletization step, a molten resin is extruded from a die with holes as strands and is then pelletized by cold cutting, hot cutting in air, or under water cutting.

In a case in which a vented extruder is used as a devolatilization device, the devolatilization step and the pelletization step may be combined.

Alternatively, in another type of devolatilization device, the resin can be pelletized by discharging the molten resin by pressurizing using a gear pump or the like, while causing the resin to pass through a die with holes to form it into strands.

Next, the following provides a description of an example of a method of producing a methacrylic resin including a glutarimide-based structural unit.

The methacrylic resin including the glutarimide-based structural unit in the main chain thereof may, for example, be a methacrylic resin including a glutarimide-based structural unit described in JP 2006-249202 A, JP 2007-009182 A, JP 2007-009191 A, JP 2011-186482 A, or WO 2012/114718 A1, and may be formed by a method described in the same publication.

The following provides a specific description of a case in which production is carried out by radical polymerization using solution polymerization as one example of a method of producing the methacrylic resin.

Initially, a (meth)acrylic acid ester polymer is produced by a polymerizing a (meth)acrylic acid ester such as methyl methacrylate. In a case in which an aromatic vinyl unit is included in the methacrylic resin including a glutarimide-based structural unit, the (meth)acrylic acid ester and an aromatic vinyl (e.g., styrene) are copolymerized to produce a (meth)acrylic acid ester-aromatic vinyl copolymer.

Subsequently, an imidization reaction is carried out by causing the (meth)acrylic acid ester polymer or the methacrylic acid ester-aromatic vinyl copolymer to react with an imidization agent (imidization process). This provides a methacrylic resin including a glutarimide-based structural unit.

The imidization agent is not particularly limited, and any imidization agents capable of producing a glutarimide-based structural unit represented by the above general formula (3) may be used.

Particular examples of the imidization agent include ammonia and a primary amine. Examples of the primary amine include primary amines having aliphatic hydrocarbon groups such as methylamine, ethylamine, n-propylamine, i-propylamine, n-butylamine, i-butylamine, tert-butylamine, and n-hexylamine; and primary amines having alicyclic hydrocarbon groups such as cyclohexylamine.

Among the above-mentioned imidization agents, ammonia, methylamine, and cyclohexylamine are preferably used from a viewpoint of the cost and the physical properties, and methylamine is particularly preferably used.

In this imidization process, the content of the glutarimide-based structural unit in the produced methacrylic resin including the glutarimide-based structural unit can be controlled by adjusting the proportion of the imidization agent added.

Although there is no particular limitation on the method of carrying out the imidization reaction, a conventionally known method can be used.

For example, an imidization reaction can be made to proceed using an extruder or a batch reaction tank.

The extruder is not particularly limited, and a single screw extruder, a twin screw extruder, a multiscrew extruder, or the like can be used, for example.

Among them, a twin screw extruder is preferably used. A twin screw extruder can promote mixing of the imidization agent with the raw material polymer.

Examples of the twin screw extruder include a non-intermeshing co-rotating twin screw extruder, an intermeshing co-rotating twin screw extruder, a non-intermeshing counter-rotating twin screw extruder, and an intermeshing counter-rotating twin screw extruder, for example.

One of the extruders exemplified above may be used alone, or two or more of them may be used by connecting them in series.

Furthermore, it is particularly preferable to attach a vent port to the extruder used, which enables the pressure to be reduced to the atmospheric pressure or lower for removal of the imidization agent used for the reaction, by-products such as methanol, or the monomers.

In production of the methacrylic resin including the glutarimide-based structural unit, an esterification process for treatment with an esterification agent such as dimethyl carbonate may be included in addition to the imidization reaction process. In this process, a catalyst such as trimethylamine, triethylamine, and tributylamine may also be used for the treatment.

Similarly to the imidization process described above, the esterification process can be made to proceed using an extruder or a batch reaction tank, for example. Furthermore, it is preferable to attach a vent port to the apparatus used, which enables the pressure to be reduced to the atmospheric pressure or lower for removal of excessive esterification agent, by-products such as methanol, or the monomers.

The methacrylic resin, which has undergone the imidization process and the optional esterification process, is melt extruded into strands by an extruder provided with a die with holes, and is pelletized into pellets by cold cutting, hot cutting in air, underwater cutting, or the like.

In addition, for reducing the number of foreign matters in the resin, it is also preferable to use a method in which the methacrylic resin is dissolved into an organic solvent such as toluene, methyl ethyl ketone, and methylene chloride, and the resultant methacrylic resin solution is filtered, followed by devolatilization of the organic solvent.

From a viewpoint of reducing the deviation in the composition of the glutarimide-based cyclic structural units among the components in the methacrylic resin having glutarimide-based structural units of different molecular weights, making the sign of the orientational birefringence when the degree of orientation is high to be different from the sign of the orientational birefringence when the degree of orientation is low, and reducing the values of orientational birefringence, it is preferable to imidize a solution of the (meth)acrylic acid ester polymer or the methacrylic acid ester-aromatic vinyl copolymer described above in a batch reaction tank. The reason why a uniform cyclic structure composition is achieved through imidization in the solution state is not clarified. It is hypothesized that mixing of the imidization agent with the polymer is improved as compared with a case where an imidization reaction is carried out in an extruder, and the frequency of contacts between the imidization agent and the polymer is increased irrespective of the molecular weight of the polymer. In contrast, it is hypothesized that, in a case where a cyclization reaction is carried out in an extruder, polymer components which have low molecular weights and have high chain end ratios are likely to undergo cyclization because they are frequently brought into contact with polymer terminals having higher mobility.

The imidization reaction is preferably carried out at 130° C. to 250° C., and is more preferably carried out at 150° C. to 230° C. Further, the reaction time is preferably 10 minutes to 5 hours, and more preferably 30 minutes to 2 hours. After the imidization process, an esterification process is performed as necessary, followed by devolatilization and pelletization processes.

From a viewpoint of improving the color tone, it is preferable to use a devolatilization device having a heat exchanger and a decompression vessel as main components thereof without any rotating part in the structure thereof.

Specifically, it is possible to employ a devolatilization device which is configured from a devolatilization tank in a configuration where a decompression unit is attached to a decompression vessel which is sized to be suitable for devolatilization and is provided with a heat exchanger disposed in the upper part thereof, and a discharge device such as a gear pump for discharging a polymerized product after devolatilization.

In this devolatilization device, a polymerization solution is preheated by feeding it to the heat exchanger such as a multi-tube heat exchanger, a plate-fin heat exchanger, and a flat plate heat exchanger having a flat plate channel and a heater, disposed in the upper part of the decompression vessel, and then is fed to the devolatilization tank that is heated under a reduced pressure to separate the copolymer from the polymerization solvent, the mixture of unreacted raw materials, polymerization by-products, and the like. A devolatilization device which does not have any rotating part as described above is preferably used because a methacrylic resin having a good color tone can be obtained.

The following provides a detailed description of a method of producing a methacrylic polymer including a lactone ring structural unit (B-3) as the structural unit (B) having a cyclic structure in the main chain thereof.

The methacrylic resin including the lactone ring structural unit in the main chain thereof can be formed, for example, by a method described in JP 2001-151814 A, JP 2004-168882 A, JP 2005-146084 A, JP 2006-96960 A, JP 2006-171464 A, JP 2007-63541 A, JP 2007-297620 A, or JP 2010-180305 A.

The following provides a specific description of a case in which production is carried out by radical polymerization using solution polymerization as one example of a method of producing the methacrylic resin including the lactone ring structural unit.

The method of producing the methacrylic resin including the lactone ring structural unit (B-3) is preferably a solution polymerization method that uses a solvent in view of promoting a cyclization reaction. Here, a lactone ring structure may be formed by using a method in which a cyclization reaction is performed after polymerization.

The methacrylic resin according to the present embodiment that includes the lactone ring structural unit can be obtained by performing a cyclization reaction after completion of the polymerization reaction. Therefore, the polymerization reaction liquid containing a solvent is preferably subjected to the lactone cyclization reaction without removing the polymerization solvent from the liquid.

The copolymer obtained through polymerization is heat treated to cause a cyclocondensation reaction between a hydroxy group and an ester group present in the molecular chain of the copolymer to thereby form a lactone ring structure.

Heat treatment for formation of the lactone ring structure may be performed, for example, using a reactor including a vacuum device or devolatilization device for removal of an alcohol that may be produced as a by-product of cyclocondensation, or an extruder including a devolatilization device.

In formation of the lactone ring structure, the heat treatment may be performed in the presence of a cyclocondensation catalyst to promote the cyclocondensation reaction.

Specific examples of cyclocondensation catalysts that can be used include monoalkyl, dialkyl, and trialkyl esters of phosphorus acid such as methyl phosphite, ethyl phosphite, phenyl phosphite, dimethyl phosphite, diethyl phosphite, diphenyl phosphite, trimethyl phosphite, and triethyl phosphite; and monoalkyl, dialkyl, and trialkyl esters of phosphoric acid such as methyl phosphate, ethyl phosphate, 2-ethylhexyl phosphate, octyl phosphate, isodecyl phosphate, lauryl phosphate, stearyl phosphate, isostearyl phosphate, dimethyl phosphate, diethyl phosphate, di-2-ethylhexyl phosphate, diisodecyl phosphate, dilauryl phosphate, distearyl phosphate, diisostearyl phosphate, trimethyl phosphate, triethyl phosphate, triisodecyl phosphate, trilauryl phosphate, tristearyl phosphate, and triisostearyl phosphate.

One of these cyclocondensation catalysts may be used alone, or two or more of these cyclocondensation catalysts may be used in combination.

Although the amount of the cyclocondensation catalyst that is used is not specifically limited, the amount of the cyclocondensation catalyst relative to 100 parts by mass of the methacrylic resin is, for example, preferably 0.01 parts by mass to 3 parts by mass, and more preferably 0.05 parts by mass to 1 part by mass.

When the amount of the catalyst used is less than 0.01 parts by mass, the reaction rate of the cyclocondensation reaction may not be sufficiently improved. On the contrary, when the amount of the catalyst used exceeds 3 parts by mass, coloring of the resultant polymer may occur or polymer crosslinking may take place, making melt molding difficult.

The timing to add the cyclocondensation catalyst is not specifically limited. For example, the cyclocondensation catalyst may be added in an initial stage of the cyclocondensation reaction, may be added during the reaction, or may be added both in the initial stage and during the reaction.

In a case in which the cyclocondensation reaction is carried out in the presence of a solvent, devolatilization is preferably carried out concurrently with the reaction.

Although no specific limitations are placed on the device used in a case in which the cyclocondensation reaction and a devolatilization step are carried out concurrently, it is preferable to use a devolatilization device comprising a heat exchanger and a devolatilization tank, a vented extruder, or an apparatus in which a devolatilization device and an extruder are arranged in series, and more preferable to use a vented twin screw extruder.

The vented twin screw extruder is preferably a vented extruder equipped with a plurality of vent ports.

In a case in which a vented extruder is used, the reaction treatment temperature is preferably 150° C. to 350° C., and more preferably 200° C. to 300° C. When the reaction treatment temperature is less than 150° C., the cyclocondensation reaction may be insufficient and residual volatile contents may increase. On the contrary, when the reaction treatment temperature exceeds 350° C., coloration or decomposition of the resultant polymer may occur.

Moreover, in a case in which a vented extruder is used, the degree of vacuum therein is preferably 10 Torr to 500 Torr, and more preferably 10 Torr to 300 Torr. When the degree of vacuum exceeds 500 Torr, the volatile content tends to remain. On the contrary, when the degree of vacuum is less than 10 Torr, industrial implementation may become difficult.

When a cyclocondensation reaction is performed as described above, an alkaline earth metal and/or amphoteric metal salt of an organic acid is preferably added during pelletization to deactivate any residual cyclocondensation catalyst.

Examples of the alkaline earth metal and/or amphoteric metal salt of an organic acid include calcium acetyl acetate, calcium stearate, zinc acetate, zinc octanoate, and zinc 2-ethylhexanoate.

After the cyclocondensation reaction step is completed, the methacrylic resin is melted and extruded as strands from an extruder equipped with a die with holes, and is then pelletized by cold cutting, hot cutting in air, or under water cutting.

The above-mentioned lactonization for forming the lactone cyclic structural unit may be carried out after production of the resin and before production of a resin composition (which will be described later), or may be carried out during the production of the resin composition together with melt kneading of the resin with components other than the resin.

A methacrylic resin according to the present embodiment preferably includes at least one cyclic structural unit selected from the group consisting of an N-substituted maleimide monomer-derived structural unit, a glutarimide structural unit, and a lactone ring structural unit. Among such cyclic structural units, it is particularly preferable that the methacrylic resin includes an N-substituted maleimide monomer-derived structural unit in terms that a high degree of control on optical properties such as the photoelastic coefficient can be easily achieved without blending with another thermoplastic resin.

(Methacrylic Resin Composition)

A methacrylic resin composition according to the present embodiment may include a methacrylic resin composition including the above-mentioned methacrylic resin according to the present embodiment. The methacrylic resin composition may optionally contain an additive in addition to the above-mentioned methacrylic resin according to the present embodiment, and may also contain a thermoplastic resin other than the methacrylic resin, a rubbery polymer, and the like.

—Additive—

The methacrylic resin composition according to the present embodiment may contain any of a wide variety of additives to the extent that the effects according to the present disclosure are not significantly lost.

Examples of the additive include, but are not particularly limited to, antioxidants; light stabilizers such as hindered amine based light stabilizers; ultraviolet absorbers; release agents; other thermoplastic resins; softeners and plasticizers such as paraffinic process oils, naphthenic process oils, aromatic process oils, paraffin, organic polysiloxanes, and mineral oils; flame retardants; antistatic agents; reinforcers such as organic fibers, inorganic fillers such as pigments including iron oxide, glass fibers, carbon fibers, and metal whiskers; coloring agents; organophosphorus compounds such as phosphite esters, phosphonites, and phosphate esters; other additives; and mixtures of any of the preceding examples.

—Antioxidant—

The methacrylic resin composition according to the present embodiment preferably contains an antioxidant which prevents degradation or coloring during shaping processing or in use.

Examples of the antioxidant include, but are not limited to, hindered phenol antioxidants, phosphoric antioxidants, and sulfuric antioxidants. The methacrylic resin of the present embodiment is suitable for use in various applications such as melt-extrusion, injection molding, and film shaping applications. The thermal history imparted in processing depends on the processing method, but may take various forms such as tens of seconds in the case of processing using an extruder to tens of minutes to several hours in the case of shaping processing of a thick product or shaping of a sheet.

In a case in which a long thermal history is imparted, it is necessary to increase the amount of a thermal stabilizer added in order to obtain the desired thermal stability. From a viewpoint of inhibiting bleed-out of the thermal stabilizer and preventing adhesion of a film to a roller during film production, it is preferable to use a plurality of thermal stabilizers in combination. For example, it is preferable to use a hindered phenol antioxidant together with at least one selected from a phosphoric antioxidant and a sulfuric antioxidant.

One of such antioxidants may be used, or two or more of such antioxidants may be used in combination.

Examples of the hindered phenol antioxidant include, but are not specifically limited to, pentaerythritol tetrakis[3-(3,5-di-tert-butyl-4-hydroxyphenyl)propionate], thiodiethylene bis[3-(3,5-di-tert-butyl-4-hydroxyphenyl)propionate], octadecyl-3-(3,5-di-tert-butyl-4-hydroxyphenyl)propionate, 3,3',3",5,5',5"-hexa-tert-butyl-a,a',a"-(mesitylene-2,4,6-triyl)tri-p-cresol, 4,6-bis(octylthiomethyl)-o-cresol, 4,6-bis(dodecylthiomethyl)-o-cresol, ethylenebis(oxyethylene) bis[3-(5-tert-butyl-4-hydroxy-m-tolyl)propionate], hexamethylene bis[3-(3,5-di-tert-butyl-4-hydroxyphenyl)propionate], 1,3,5-tris(3,5-di-tert-butyl-4-hydroxybenzyl)-1,3,5-triazine-2,4,6(1H,3H,5H)-trione, 1,3,5-tris[(4-tert-butyl-3-hydroxy-2,6-xylene)methyl]-1,3,5-triazine-2,4,6 (1H,3H,5H)-trione, 2,6-di-tert-butyl-4-(4,6-bis(octylthio)-1,3,5-triazin-2-ylamine)phenol, 2-[1-(2-hydroxy-3,5-di-tert-pentylphenyl)ethyl]-4,6-di-tert-pentylphenyl acrylate, and 2-tert-butyl-4-methyl-6-(2-hydroxy-3-tert-butyl-5-methylbenzyl)phenyl acrylate.

In particular, pentaerythritol tetrakis[3-(3,5-di-tert-butyl-4-hydroxyphenyl)propionate], octadecyl-3-(3,5-di-t-butyl-4-hydroxyphenyl)propionate, and 2-[1-(2-hydroxy-3,5-di-tert-pentylphenyl)ethyl]-4,6-di-tert-pentylphenyl acrylate are preferable.

Commercially available hindered phenol antioxidants may be used as these hindered phenol antioxidants as the thermal stabilizer. Examples of such commercially available hindered phenol antioxidants include, but are not specifically limited to, Irganox 1010; pentaerythritol tetrakis[3-(3,5-di-t-butyl-4-hydroxyphenyl)propionate]; produced by BASF), Irganox 1076 (octadecyl-3-(3,5-di-t-butyl-4-hydroxyphenyl)propionate; produced by BASF), Irganox 1330 (3,3',3",5,5',5"-hexa-t-butyl-a,a',a"-(mesitylene-2,4,6-triyl) tri-p-cresol; produced by BASF), Irganox 3114 (1,3,5-tris (3,5-di-t-butyl-4-hydroxybenzyl)-1,3,5-triazine-2,4,6(1H, 3H,5H)-trione; produced by BASF), Irganox 3125 (produced by BASF), ADK STAB AO-60 (pentaerythritol tetrakis[3-(3,5-di-t-butyl-4-hydroxyphenyl)propionate]; produced by Adeka Corporation), ADK STAB AO-80 (3,9-bis{2-[3-(3-t-butyl-4-hydroxy-5-methylphenyl)propionyloxy]-1,1-dimethylethyl}-2,4,8,10-tetraoxaspiro[5.5]undecane; produced by Adeka Corporation), Sumilizer BHT (produced by Sumitomo Chemical Co., Ltd.), Cyanox 1790 (produced by Cytec Solvay Group), Sumilizer GA-80 (produced by Sumitomo Chemical Co., Ltd.), Sumilizer GS (2-[1-(2-hydroxy-3,5-di-tert-pentylphenyl)ethyl]-4,6-di-tert-pentylphenyl) acrylate; produced by Sumitomo Chemical Co., Ltd.), Sumilizer GM (2-tert-butyl-4-methyl-6-(2-hydroxy-3-tert-butyl-5-methylbenzyl)phenyl acrylate; produced by Sumitomo Chemical Co., Ltd.), and vitamin E (produced by Eisai Co., Ltd.).

Among these commercially available phenolic antioxidants, Irganox 1010, ADK STAB AO-60, ADK STAB AO-80, Irganox 1076, Sumilizer GS, and the like are preferable in terms of thermal stability imparting effect in the resin.

One of these phenolic antioxidants may be used alone, or two or more of these phenolic antioxidants may be used in combination.

Phosphoric antioxidants that can be used as the heat stabilizer may be, but are not limited to, tris(2,4-di-t-butylphenyl)phosphite, bis(2,4-bis(1,1-dimethylethyl)-6-methylphenyl)ethyl ester phosphorous acid, tetrakis(2,4-di-t-butylphenyl)(1,1-biphenyl)-4,4'-diyl bisphosphonite, bis (2,4-di-t-butylphenyl)pentaerythritol diphosphite, bis(2,6-di-t-butyl-4-methylphenyl)pentaerythritol diphosphite, bis (2,4-dicumylphenyl)pentaerythritol diphosphite, tetrakis(2, 4-t-butylphenyl)(1,1-biphenyl)-4,4'-diyl bisphosphonite, di-t-butyl-m-cresyl-phosphonite, and 4-[3-[(2,4,8,10-tetra-tert-butyldibenzo[d,f][1,3,2]dioxaphosphepin)-6-yloxy]propyl]-2-methyl-6-tert-butylphenol.

The phosphorus antioxidant may be commercially available phosphorus antioxidants. Examples of such commercially available phosphorus antioxidants include, but are not limited to, Irgafos 168 (tris(2,4-di-t-butylphenyl) phosphite; produced by BASF), Irgafos 12 (tris[2-[[2,4,8,10-tetra-t-butyldibenzo[d,f][1,3,2]dioxaphosphepin-6-yl]oxy]ethyl]amine; produced by BASF), Irgafos 38 (bis(2,4-bis(1,1-dimethylethyl)-6-methylphenyflethyl phosphite, produced by BASF), ADEKASTAB 329K (ADK STAB-229K, produced by Adeka Corporation), ADEKASTAB PEP-36 (ADK STAB PEP-36, produced by Adeka Corporation), ADEKASTAB PEP-36A (ADK STAB PEP-36A, produced by Adeka Corporation), ADEKASTAB PEP-8 (ADK STAB PEP-8, produced by Adeka Corporation), ADEKASTAB HP-10 (ADK STAB HP-10, produced by Adeka Corporation), ADEKASTAB 2112 (ADK STAB 2112, produced by Adeka Corporation), ADEKASTAB 1178 (ADK STAB 1178, produced by Adeka Corporation), ADEKASTAB 1500 (ADK STAB 1500, produced by Adeka Corporation), Sandstab P-EPQ (produced by Cryant Corporation), Weston 618 (produced by GE Corporation), Weston 619G (produced by GE Corporation), Ultranox 626 (produced by GE Corporation), Sumilizer GP (4-[3-[(2,4,8,10-tetra-tert-butyldibenzo[d,f][1,3,2]dioxaphosphepin)-6-iloxy]propyl]-2-methyl-6-tert-butylphenol, produced by Sumitomo Chemical Co., Ltd.), HCA (9,10-dihydro-9-oxa-10-phosphaphenanthrene-10-oxide, produced by Sanko Co., Ltd.), and so forth.

Among these commercially available phosphorus antioxidants, from a viewpoint of an effect of imparting thermal stability in the resin and an effect of using in combination with various antioxidants, Irgafos 168, ADEKASTAB PEP-36, ADEKASTAB PEP-36A, ADEKASTAB HP-10, and ADEKASTAB 1178 are preferable, and ADEKASTAB PEP-36 and ADEKASTAB PEP-36A are particularly preferable.

One phosphorus antioxidant may be used alone, or two or more phosphorus antioxidants may be used in combination.

Examples of sulfuric antioxidants that can be used as the antioxidant include, but are not specifically limited to, 2,4-bis(dodecylthiomethyl)-6-methylphenol (Irganox 1726 produced by BASF), Irganox 1520L (produced by BASF), 2,2-bis[[3-(dodecylthio)-1-oxopropoxy]methyl]propane-1, 3-diyl bis[3-(dodecylthio)propionate] (ADK STAB AO-412S produced by Adeka Corporation), 2,2-bis[[3-(dodecylthio)-1-oxopropoxy]methyl]propane-1,3-diyl bis[3-(dodecylthio)propionate] (KEMINOX PLS produced by Chemipro Kasei Kaisha, Ltd.), and di(tridecyl)-3,3'-thiodipropionate (AO-503 produced by Adeka Corporation).

Among these commercially available sulfuric antioxidants, ADK STAB AO-412S and KEMINOX PLS are preferable from a viewpoint of an effect of imparting thermal stability in the resin, an effect of using in combination with various antioxidants, and handleability.

One of these sulfuric antioxidants may be used alone, or two or more of these sulfuric antioxidants may be used in combination.

Although the content of the antioxidant can be any amount that enables an effect of thermal stability improvement to be obtained, an excessive content may lead to problems such as bleed-out during processing. Accordingly, the content of the thermal stabilizer per 100 parts by mass of the methacrylic resin is preferably 5 parts by mass or less, more preferably 3 parts by mass or less, even more preferably 1 part by mass or less, further preferably 0.8 parts by mass or less, even further preferably 0.01 parts by mass to 0.8 parts by mass, and particularly preferably 0.01 parts by mass to 0.5 parts by mass.

There is no particular limitation on the timing to add the antioxidant, and examples include a method in which the antioxidant is added to a monomer solution before polymerization, followed by initiating polymerization; a method in which the antioxidant is added to and mixed with a polymer solution after polymerization, followed by being subjected to a devolatilization process; a method in which the antioxidant is added to and mixed with a molten polymer after devolatilization, followed by pelletization; and a method in which the antioxidant is added to and mixed with pellets which are melt-extruded once again after devolatilization and pelletization. Among these methods, from a viewpoint of preventing thermal degradation and coloring in the devolatilization process, the antioxidant is preferably added to and mixed with a polymer solution after polymerization and before a devolatilization process, followed by being subjected to a devolatilization process.

—Hindered Amine Based Light Stabilizer—

The methacrylic resin composition according to the present embodiment resin composition may contain a hindered amine based light stabilizer.

The hindered amine based light stabilizer is not specifically limited, but is preferably a compound including three or more cyclic structures. Here, it is preferable that the cyclic structures are at least one selected from the group consisting of aromatic rings, aliphatic rings, aromatic heterocycles, and nonaromatic heterocycles; and in a case in which one compound includes two or more cyclic structures, these cyclic structures may be either identical to or different from each other.

Specific examples of the hindered amine based light stabilizer include, but are not limited to, bis(1,2,2,6,6-pentamethyl-4-piperidyl) [[3,5-bis(1,1-dimethylethyl)-4-hydroxyphenyl]methyl]butylmalonate; a mixture of bis(1,2,2, 6,6-pentamethyl-4-piperidyl) sebacate and methyl-1,2,2,6, 6-pentamethyl-4-piperidyl sebacate; bis(2,2,6,6-tetramethyl-4-piperidyl) sebacate; N,N'-bis(2,2,6,6-tetramethyl-4-piperidyl)-N,N'-diformylhexamethylenediamine; polycondensates of dibutylamine, 1,3,5-triazine, and N,N'-bis(2,2,6,6-tetramethyl-4-piperidyl-1,6-hexamethylenediamine with N-(2,2,6,6-tetramethyl-4-piperidyl)butylamine; poly[{6-(1,1,3,3-tetramethylbutyl)amino-1,3,5-triazine-2,4-diyl}{(2,2,6,6-tetramethyl-4-piperidyl)imino}hexamethylene {(2,2,6,6-tetramethyl-4-piperidy)imino}]; tetrakis(1,2,2,6,6-pentamethyl-4-piperidyl)butane-1,2,3,4-tetracarboxylate; tetrakis(2,2,6,6-tetramethyl-4-piperidyl)butane-1,2,3,4-tetracarboxylate; reactants of 1,2,2,6,6-pentamethyl-4-piperidiol and β,β,β',β'-tetramethyl-2,4,8,10-tetraoxaspiro[5.5]undecane-3,9-diethanol; reactants of 2,2,6,6-tetramethyl-4-piperidiol and β,β,β',β'-tetramethyl-2,4,8,10-tetraoxaspiro[5.5]undecane-3,9-diethanol; bis(1-undecanoxy-2,2,6,6-tetramethylpiperidine-4-il) carbonate; 1,2,2,6,6-pentamethyl-4-piperidyl methacrylate; and 2,2,6,6-tetramethyl-4-piperidylmethacrylate.

Among these, preferable examples include bis(1,2,2,6,6-pentamethyl-4-piperidyl) [[3,5-bis(1,1-dimethylethyl)-4-hydroxyphenyl]methyl]butylmalonate; polycondensates of dibutylamine, 1,3,5-triazine, and N,N'-bis(2,2,6,6-tetramethyl-4-piperidyl-1,6-hexamethylenediamine with N-(2,2,6,6-tetramethyl-4-piperidyl)butylamine; poly[{6-(1,1,3,3-tetramethylbutyl)amino-1,3,5-triazine-2,4-diyl}{(2,2,6,6-tetramethyl-4-piperidyl)imino}hexamethylene{(2,2,6,6-tetramethyl-4-piperidyl)imino}]; reactants of 1,2,2,6,6-pentamethyl-4-piperidiol and β,β,β',β'-tetramethyl-2,4,8,10-tetraoxaspiro[5.5]undecane-3,9-diethanol; and reactants of 2,2,6,6-tetramethyl-4-piperidiol and β,β,β',β'-tetramethyl-2,4,8,10-tetraoxaspiro[5.5]undecane-3,9-diethanol, which include three or more cyclic structures.

Although the content of the hindered amine based light stabilizer can be any amount that enables an effect of light stability improvement to be obtained, an excessive content may lead to problems such as bleed-out during processing. Accordingly, the content of the hindered amine based light stabilizer per 100 parts by mass of the methacrylic resin is preferably 5 parts by mass or less, more preferably 3 parts by mass or less, even more preferably 1 part by mass or less, further preferably 0.8 parts by mass or less, even further preferably 0.01 parts by mass to 0.8 parts by mass, and particularly preferably 0.01 parts by mass to 0.5 parts by mass.

—Ultraviolet Absorber—

The methacrylic resin composition according to the present embodiment may contain an ultraviolet absorber Although no specific limitations are placed on ultraviolet absorbers that can be used, an ultraviolet absorber having a maximum absorption wavelength in a range of 280 nm to 380 nm is preferable. Examples of ultraviolet absorbers that can be used include benzotriazole compounds, benzotriazine compounds, benzophenone compounds, oxybenzophenone compounds, benzoate compounds, phenolic compounds, oxazole compounds, cyanoacrylate compounds, and benzoxazinone compounds.

Examples of benzotriazole compounds that can be used include 2,2'-methylenebis[4-(1,1,3,3-tetramethylbutyl)-6-(2H-benzotriazol-2-yl) phenol], 2-(3,5-di-tert-butyl-2-hydroxyphenyl)-5-chlorobenzotriazole, 2-(2H-benzotriazol-2-yl)-p-cresol, 2-(2H-benzotriazol-2-yl)-4,6-bis(1-methyl-1-phenylethyl)phenol, 2-benzotriazol-2-yl-4,6-di-tert-butylphenol, 2-[5-chloro(2H)-benzotriazol-2-yl]-4-methyl-6-t-butylphenol, 2-(2H-benzotriazol-2-yl)-4,6-di-t-butylphenol, 2-(2H-benzotriazol-2-yl)-4-(1,1,3,3-tetramethylbutyl)phenol, 2-(2H-benzotriazol-2-yl)-4-methyl-6-(3,4,5,6-tetrahydrophthalimidylmethyl) phenol, reaction products of methyl 3-(3-(2H-benzotriazol-2-yl)-5-t-butyl-4-hydroxyphenyl)propionate and polyethylene glycol 300, 2-(2H-benzotriazol-2-yl)-6-(linear/branched dodecyl)-4-methylphenol, 2-(5-methyl-2-hydroxyphenyl) benzotriazole, 2-[2-hydroxy-3,5-bis(α,α-dimethylbenzyl) phenyl]-2H-benzotriazole, and 3-(2H-benzotriazol-2-yl)-5-(1,1-dimethylethyl)-4-hydroxy-C7-9 branched/linear alkyl esters.

Among these benzotriazole compounds, benzotriazole compounds having a molecular weight of 400 or more are preferable. Examples of such benzotriazole compounds that are commercially available products include Kemisorb® 2792 (Kemisorb is a registered trademark in Japan, other countries, or both; produced by Chemipro Kasei Kaisha, Ltd.), ADK STAB® LA31 (ADK STAB is a registered trademark in Japan, other countries, or both; produced by Adeka Corporation), and TINUVIN® 234 (TINUVIN is a registered trademark in Japan, other countries, or both; produced by BASF).

Examples of benzotriazine compounds that can be used include 2-mono(hydroxyphenyl)-1,3,5-triazine compounds, 2,4-bis(hydroxyphenyl)-1,3,5-triazine compounds, and 2,4,6-tris(hydroxyphenyl)-1,3,5-triazine compounds. Specific examples include 2,4-diphenyl-6-(2-hydroxy-4-methoxyphenyl)-1,3,5-triazine, 2,4-diphenyl-6-(2-hydroxy-4-ethoxyphenyl)-1,3,5-triazine, 2,4-diphenyl-(2-hydroxy-4-propoxyphenyl)-1,3,5-triazine, 2,4-diphenyl-(2-hydroxy-4-butoxyphenyl)-1,3,5-triazine, 2,4-diphenyl-6-(2-hydroxy-4-butoxyphenyl)-1,3,5-triazine, 2,4-diphenyl-6-(2-hydroxy-4-hexyloxyphenyl)-1,3,5-triazine, 2,4-diphenyl-6-(2-hydroxy-4-octyloxyphenyl)-1,3,5-triazine, 2,4-diphenyl-6-(2-hydroxy-4-dodecyloxyphenyl)-1,3,5-triazine, 2,4-diphenyl-6-(2-hydroxy-4-benzyloxyphenyl)-1,3,5-triazine, 2,4-diphenyl-6-(2-hydroxy-4-butoxyethoxy)-1,3,5-triazine, 2,4-bis(2-hydroxy-4-butoxyphenyl)-6-(2,4-dibutoxyphenyl)-1,3,5-triazine, 2,4,6-tris(2-hydroxy-4-methoxyphenyl)-1,3,5-triazine, 2,4,6-tris(2-hydroxy-4-ethoxyphenyl)-1,3,5-triazine, 2,4,6-tris(2-hydroxy-4-propoxyphenyl)-1,3,5-triazine, 2,4,6-tris(2-hydroxy-4-butoxyphenyl)-1,3,5-triazine, 2,4,6-tris(2-hydroxy-4-hexyloxyphenyl)-1,3,5-triazine, 2,4,6-tris(2-hydroxy-4-octyloxyphenyl)-1,3,5-triazine, 2,4,6-tris(2-hydroxy-4-dodecyloxyphenyl)-1,3,5-triazine, 2,4,6-tris(2-hydroxy-4-benzyloxyphenyl)-1,3,5-triazine, 2,4,6-tris(2-hydroxy-4-ethoxyethoxyphenyl)-1,3,5-triazine, 2,4,6-tris(2-hydroxy-4-butoxyethoxyphenyl)-1,3,5-triazine, 2,4,6-tris(2-hydroxy-4-propoxyethoxyphenyl)-1,3,5-triazine, 2,4,6-tris(2-hydroxy-4-methoxycarbonylpropyloxyphenyl)-1,3,5-triazine, 2,4,6-tris(2-hydroxy-4-ethoxycarbonylethyloxyphenyl)-1,3,5-triazine, 2,4,6-tris(2-hydroxy-4-(1-(2-ethoxyhexyloxy)-1-oxopropan-2-yloxy)phenyl)-1,3,5-triazine, 2,4,6-tris(2-hydroxy-3-methyl-4-methoxyphenyl)-1,3,5-triazine, 2,4,6-tris(2-hydroxy-3-methyl-4-ethoxyphenyl)-1,3,5-triazine, 2,4,6-tris(2-hydroxy-3-methyl-4-propoxyphenyl)-1,3,5-triazine, 2,4,6-tris(2-hydroxy-3-methyl-4-butoxyphenyl)-1,3,5-triazine, 2,4,6-tris(2-hydroxy-3-methyl-4-hexyloxyphenyl)-1,3,5-triazine, 2,4,6-tris(2-hydroxy-3-methyl-4-octyloxyphenyl)-1,3,5-triazine, 2,4,6-tris(2-hydroxy-3-methyl-4-dodecyloxyphenyl)-1,3,5-triazine, 2,4,6-tris(2-hydroxy-3-methyl-4-benzyloxyphenyl)-1,3,5-triazine, 2,4,6-tris(2-hydroxy-3-methyl-4-ethoxyethoxyphenyl)-1,3,5-triazine, 2,4,6-tris(2-hydroxy-3-methyl-4-butoxyethoxyphenyl)-1,3,5-triazine, 2,4,6-tris(2-hydroxy-3-methyl-4-propoxyethoxyphenyl)-1,3,5-triazine, 2,4,6-tris(2-hydroxy-3-methyl-4-methoxycarbonylpropyloxyphenyl)-1, 3,5-triazine, 2,4,6-tris(2-hydroxy-3-methyl-4-ethoxycarbonylethyloxyphenyl)-1,3,5-triazine, and 2,4,6-tris(2-hydroxy-3-methyl-4-(1-(2-ethoxyhexyloxy)-1-oxopropane-2-yloxy)phenyl)-1,3,5-triazine.

Commercially available products such as Kemisorb 102 (produced by Chemipro Kasei Kaisha, Ltd.), LA-F70 (produced by Adeka Corporation), LA-46 (produced by Adeka Corporation), TINUVIN 405 (produced by BASF), TINUVIN 460 (produced by BASF), TINUVIN 479 (produced by BASF), and TINUVIN 1577FF (produced by BASF) may be used as the benzotriazine compounds.

Among these benzotriazine compounds, an ultraviolet absorber having a 2,4-bis(2,4-dimethylphenyl)-6-[2-hydroxy-4-(3-alkyloxy-2-hydroxy propyloxy)-5-α-cumylphenyl]-s-triazine framework ("alkyloxy" refers to a long chain alkyloxy group such as an octyloxy, nonyloxy, or decyloxy group) is more preferable in terms of having high compatibility with acrylic resins and excellent ultraviolet absorption properties.

Particularly from a viewpoint of compatibility with resins and volatility during heating, the ultraviolet absorber is preferably a benzotriazole compound having a molecular weight of 400 or more or a benzotriazine compound, and from a viewpoint of inhibiting decomposition of the ultraviolet absorber under heating during extrusion, the ultraviolet absorber is particularly preferably a benzotriazine compound.

The melting point (Tm) of the ultraviolet absorber is preferably 80° C. or higher, more preferably 100° C. or higher, even more preferably 130° C. or higher, and still more preferably 160° C. or higher.

When the ultraviolet absorber is heated from 23° C. to 260° C. at a rate of 20° C./min, the weight loss rate of the ultraviolet absorber is preferably 50% or less, more preferably 30% or less, even more preferably 15% or less, further preferably 10% or less, and even further preferably 5% or less.

One of such ultraviolet absorbers may be used alone, or two or more of such ultraviolet absorbers may be used in combination. By using two types of ultraviolet absorbers having different structures, ultraviolet light can be absorbed over a wider wavelength region.

The amount of the ultraviolet absorber is not specifically limited so long as the disclosed effects can be exhibited without impairing heat resistance, damp heat resistance, thermal stability, and molding properties. Nevertheless, the amount of the ultraviolet absorber relative to 100 parts by mass of the methacrylic resin is preferably 0.1 parts by mass to 5 parts by mass, more preferably 0.2 parts by mass to 4 parts by mass, even more preferably 0.25 parts by mass to 3 parts by mass, and still more preferably 0.3 parts by mass to 3 parts by mass. When the amount of the ultraviolet absorber is within one of the ranges set forth above, an excellent balance of ultraviolet light absorption performance, molding properties, and so forth can be obtained.

—Release Agent—

The methacrylic resin composition according to the present embodiment may contain a release agent. Examples of the release agent include, but are not limited to, fatty acid esters, fatty acid amides, fatty acid metal salts, hydrocarbon based lubricants, alcohol based lubricants, polyalkylene glycols, carboxylic acid esters, and paraffin based mineral oils of and hydrocarbons.

Fatty acid esters that can be used as the release agent are not specifically limited, and may be conventionally known ones.

Examples of the fatty acid ester include ester compounds of a fatty acid having a carbon number of 12 to 32 such as lauric acid, palmitic acid, heptadecanoic acid, stearic acid, oleic acid, arachidic acid, behenic acid, etc., and a monovalent aliphatic alcohol such as palmityl alcohol, stearyl alcohol, behenyl alcohol, etc., or a multivalent aliphatic alcohol such as glycerin, pentaerythritol, dipentaerythritol, sorbitan, etc.; and complex ester compounds of a fatty acid, a polybasic organic acid, and a monovalent aliphatic alcohol or a multivalent aliphatic alcohol.

Examples of such fatty acid ester based lubricant include cetyl palmitate, butyl stearate, stearyl stearate, stearyl citrate, glycerin monocaprylate, glycerin monocaprate, glycerin monolaurate, glycerin monopalmitate, glycerin dipalmitate, glycerin monostearate, glycerin distearate, glycerin tristearate, glycerin monooleate, glycerin dioleate, glycerin trioleate, glycerin monolinoleate, glycerin monobehenate, glycerin mono(12-hydroxy) stearate, glycerin di(12-hydroxy) stearate, glycerin tri(12-hydroxy) stearate, glycerin diacetomonostearate, glycerin citric acid fatty acid ester, pentaerythritol adipic acid stearic acid ester, montanic acid partially saponified ester, pentaerythritol tetrastearate, dipentaerythritol hexastearate, and sorbitan tristearate.

One fatty acid ester based lubricant may be used alone, or two or more fatty acid ester based lubricants may be used in combination.

Examples of commercially products include Rikemal series, Poem series, Rikester series, and Rikemaster series produced by Riken Vitamin Co., Ltd., Excel series, Rheodol series, Exceparl series, and Coconad series produced by Kao Corporation. Specific examples include Rikemal S-100, Rikemal H-100, Poem V-100, Rikemal B-100, Rikemal HC-100, Rikemal S-200, Poem B-200, Rikester EW-200, Rikester EW-400, Excel S-95, and Rheodol MS-50.

Fatty acid amide based lubricants are not specifically limited, and may be conventionally known ones.

Examples of the fatty acid amide based lubricant include saturated fatty acid amides such as lauric acid amide, palmitic acid amide, stearic acid amide, behenic acid amide, and hydroxystearic acid amide; unsaturated fatty acid amides such as oleic acid amide, erucic acid amide, and ricinoleic acid amide; substituted amides such as N-stearyl stearic acid amide, N-oleyl oleic acid amide, N-stearyl oleic acid amide, N-oleyl stearic acid amide, N-stearyl erucic acid amide, and N-oleyl palmitic acid amide; methylol amides such as methylol stearic acid amide and methylol behenic acid amide; saturated fatty acid bisamides such as methylene-bis-stearic acid amide, ethylene-bis-capric acid amide, ethylene-bis-lauric acid amide, ethylene-bis-stearic acid amide (ethylene-bis-stearyl amide), ethylene-bis-isostearic acid amide, ethylene-bis-hydroxy stearic acid amide, ethylene-bis-behenic acid amide, hexamethylene-bis-stearic acid amide, hexamethylene-bis-behenic acid amide, hexamethylene-bis-hydroxy stearic acid amide, N,N'-distearyl adipic acid amide, and N,N'-distearyl sebacic acid amide; unsaturated fatty acid bisamides such as ethylene-bis-oleic acid amide, hexamethylene-bis-oleic acid amide, N,N'-dioleyl adipic acid amide, and N,N'-dioleyl sebacic acid amide; and aromatic bisamides such as m-xylylene-bis-stearic acid amide and N,N'-distearyl isophthalic acid amide.

One fatty acid amide based release agent may be used alone, or two or more fatty acid ester based release agents may be used in combination.

Examples of commercially available products include Diamid series (produced by Nippon Kasei Chemical Co., Ltd.), Amide series (produced by Nippon Kasei Chemical Co., Ltd.), Nikka Amide series (produced by Nippon Kasei Chemical Co., Ltd.), Methylol Amide series, Bisamide series, Slipax series (produced by Nippon Kasei Chemical Co., Ltd.), Kao Wax series (produced by Kao Corporation), Fatty Acid Amide series (produced by Kao Corporation), ethylene-bis-stearic acid amides (produced by Dainichi Chemical Industry Co., Ltd.), and so forth.

Fatty acid metallic salts refer to metallic salts of higher fatty acids. Examples include lithium stearate, magnesium stearate, calcium stearate, calcium laurate, calcium ricinoleate, strontium stearate, barium stearate, barium laurate, barium ricinoleate, zinc stearate, zinc laurate, zinc ricinoleate, zinc 2-ethylhexanoate, lead stearate, dibasic lead stearate, lead naphthenate, calcium 12-hydroxystearate, lithium 12-hydroxystearate, and so forth. Among these, from a viewpoint of excellent processability and extremely excellent transparency of the obtained transparent resin composition, calcium stearate, magnesium stearate, and zinc stearate are particularly preferable.

Commercially available products include SZ series, SC series, SM series, SA series and so forth produced by Sakai Chemical Industry Co., Ltd.

From a viewpoint of maintaining transparency, in a case where the fatty acid metallic salts are used, it is preferable that the amount of a fatty acid metallic salt is 0.2 mass % or less relative to 100 mass % of the methacrylic resin composition.

One release agent may be used alone, or two or more release agents may be used in combination.

A release agent that is used preferably has a decomposition start temperature of 200° C. or higher. The decomposition start temperature may be measured through a 1% mass loss temperature in TGA.

Although the content of the release agent can be any amount as long as an effect as a release agent can be obtained, and an excessive content may lead to problems such as bleed-out during processing. Accordingly, the content of the release agent is preferably 5 parts by mass or less, more preferably 3 parts by mass or less, even more preferably 1 parts by mass or less, further preferably 0.8 parts by mass or less, even further preferably 0.01 to 0.8 parts by mass, particularly preferably 0.01 to 0.5 parts by mass per 100 parts by mass of the methacrylic resin. The release agent is preferably added in an amount in any of the ranges set forth above, because deterioration of the transparency due to addition of the release agent is inhibited and poor release from the mold or adhesion to metal rolls tend to be inhibited during injection molding.

—Other Thermoplastic Resin—

The methacrylic resin composition according to the present embodiment may contain a thermoplastic resin other than the methacrylic resin with the aim of adjusting the birefringence or improving the flexibility, so long as the objectives of the present disclosure are not impeded.

Examples of other thermoplastic resins include polyacrylates such as polybutyl acrylate; styrene polymers such as polystyrene, styrene-methyl methacrylate copolymer, styrene-butyl acrylate copolymer, styrene-acrylonitrile copolymer, and acrylonitrile-butadiene-styrene block copolymer; acrylic rubber particles having a three- or four-layer structure described in JP S59-202213 A, JP S63-27516 A, JP S51-129449 A, and JP S52-56150 A; rubbery polymers disclosed in JP S60-17406 B and JP H8-245854 A; and methacrylic rubber-containing graft copolymer particles obtained by multi-step polymerization described in WO 2014/002491 A1.

Among these other thermoplastic resins, from a viewpoint of obtaining good optical properties and mechanical properties, it is preferable to use a styrene-acrylonitrile copolymer or rubber-containing graft copolymer particles having a grafted portion in a surface layer thereof with a chemical composition that is compatible with the methacrylic resin including the structural unit (X) having a cyclic structure in the main chain thereof.

The average particle diameter of acrylic rubber particles, methacrylic rubber-containing graft copolymer particles, or a rubbery polymer such as described above is preferably 0.03 μm to 1 μm, and more preferably 0.05 μm to 0.5 μm from a viewpoint of improving impact strength, optical properties, and so forth of a shaped article obtained using the composition according to the present embodiment.

The content of other thermoplastic resin relative to 100 parts by mass of the methacrylic resin is 0 parts by mass to 50 parts by mass, and more preferably 0 parts by mass to 25 parts by mass.

(Method of Producing Methacrylic Resin Composition)

The method by which the methacrylic resin composition is produced may, for example, be a method of kneading using a kneading machine such as an extruder, a heating roller, a kneader, a roller mixer, or a Banbury mixer.

Kneading by an extruder is preferable in terms of productivity. The kneading temperature may be set in accordance with the preferable processing temperature of the polymer forming the methacrylic resin and any other resins mixed therewith. As a guideline, the kneading temperature may be within a range of 140° C. to 300° C., and preferably a range of 180° C. to 280° C. Moreover, it is preferable that the extruder includes a vent port in order to reduce volatile content.

The glass transition temperature (Tg), the weight average molecular weight (Mw), the number average molecular weight (Mn), the orientational birefringence, and the photoelastic coefficient $C_R$ of the methacrylic resin composition may be the same as those described above for the methacrylic resin.

(Shaped Article)

A shaped article according to the present embodiment may contain the methacrylic resin according to the present embodiment, or may contain the methacrylic resin composition according to the present embodiment.

(Method of Producing Shaped Article)

In terms of the method of producing a shaped article according to the present disclosure, a wide variety of molding methods can be adopted such as extrusion molding, injection molding, compression molding, calendar molding, inflation molding, and blow molding. Among them, injection molding and injection compression molding are preferably applied from a viewpoint of the productivity Typically, the injection molding method includes (1) an injection step of melting a resin and filling the cavity in a temperature-controlled mold with the molten resin; (2) a pressure maintaining step of applying a pressure to the cavity until the gate is sealed, and injecting an additional resin in the amount corresponding to the volume of contraction of the molten resin which was filled in the injection step, the contraction being induced by cooling of the resin when brought into contact with the mold; (3) a cooling step of the maintained pressure is released and then holding the shaped article until the resin is cooled; and (4) a step of opening the mold and taking out the shaped article that has been cooled.

In this method, the molding temperature is preferably in the range of Tg+100° C. to Tg+160° C., and preferably in the range of Tg+110° C. to Tg+150° C., relative to the glass transition temperature (Tg) of the methacrylic resin composition. Here, the molding temperature refers to the control temperature of a band heater wound around an injection nozzle.

Further, the mold temperature is preferably in the range of Tg−70° C. to Tg, and preferably in the range of Tg−50° C. to Tg−20° C., relative to the glass transition temperature (Tg) of the methacrylic resin composition.

Further, the injection rate can be appropriately selected depending on the thickness and the dimensions of an injection molded shaped article to be produced, and can be appropriately selected from the range of 200 mm/sec to 1000 mm/sec, for example.

Further, the maintained pressure can be appropriately selected depending on the shape of an injection molded shaped article to be produced, and can be appropriately selected from the range of 30 MPa to 120 MPa, for example. When the shaped article is thin and the solidification rate is high, no maintained pressure may be applied in some cases.

Here, the maintained pressure refers to a pressure maintained by a screw which feeds an additional molten resin from the gate after filling of the molten resin.

The injection compression molding is an injection molding method in which a mold is slightly opened at the start of injection molding, and a molten resin is filled into the mold at a high rate under a low pressure, followed by a compression pressure maintaining step in which the clamping pressure is increased at a high rate so that a uniform pressure to be applied on the entire surface of the resin is maintained, thereby enabling formation of a shaped article excellent in surface properties and optical properties.

The injection compression molding is particularly preferable for producing a thin injection molded shaped article, such as an injection molded shaped article with a thickness of less than 1 mm and a diagonal dimension of longer than 100 mm, for example, because the injection compression molding enables production of shaped articles excellent in optical properties and color tone.

In addition, the injection molded shaped article produced using the methacrylic resin composition according to the present embodiment may be provided with minute irregularities on a surface thereof in a case in which the injection molded shaped article is used as a light guide plate. Provision of such minute irregularities is preferable because the need for providing a separate reflective layer by printing or the like can be eliminated. Examples of the minute irregularities include, but are not particularly limited to, irregularities having distinctly defined patterns having a shape such as rectangular parallelepipeds, columns, elliptical cylinders, triangular prisms, spheres, and aspherical shapes; irregularities without distinctly defined patterns such as satin-like texture and hairline and combinations of these, irregularities having distinctly defined patterns of which morphology, particularly size, is varied. An example of the irregularities is a morphology with a height or recess depth of 0.1 μm to 500 μm, and the pitch distance between the irregularities of 10 μm to 1000 μm.

Various shaped articles including the methacrylic resin of the present embodiment or the resin composition thereof may be further subjected to surface functionalization treatment such as hard coating treatment, anti-glare treatment, anti-reflection treatment, transparent conductive treatment, electromagnetic shielding treatment, or gas barrier treatment.

Although there is no particular limitation on the thickness of such a functional layer, the thickness of the functional layer is typically in the range of 0.01 μm to 10 μm.

In a case where a surface of a shaped article is subjected to a hard coating treatment, a hard coating layer can be applied to the surface, for example, by applying a coating liquid containing a silicone-based curable resin, a curable resin containing organic polymer composite inorganic fine particles, or an acrylate such as urethane acrylate, epoxy acrylate, and a multifunctional acrylate, and a photopolymerization initiator dissolved or dispersed in an organic solvent, onto a film or sheet produced from the methacrylic resin composition according to the present embodiment by a conventionally known coating method, followed by drying and photo-curing of the coating.

Furthermore, before application of a hard coating layer, a method for improving the adhesiveness may also be used in which an easy adhesion layer, a primer layer, an anchor layer, or the like having the composition containing inorganic fine particles is applied, followed by formation of the hard coating layer, for example.

The anti-glare layer to be applied on the surface is formed by preparing an ink of particles of silica, a melamine resin, an acrylic resin, or the like, and applying the ink on another functional layer by a conventionally known coating method to form a layer, which is then heat- or photo-cured.

Examples of the anti-reflection layer to be applied on the surface include a thin film of an inorganic substance such as a metal oxide, a fluoride, a silicide, a boride, a nitride, and a sulfide; and a single layer or a stack of multiple layers of resins having different refractive indices such as an acrylic resin and a fluororesin. Alternatively, a stack of thin layers including composite fine particles of an inorganic compound and an organic compound can also be used.

(Properties of Shaped Article)

The following provides a description of properties of the shaped article according to the present embodiment.

The average of the absolute value of the in-plane phase difference (Re) per 1 mm of the thickness of the shaped article according to the present embodiment is preferably 5.0 nm or less, more preferably 4.0 nm or less, even more preferably 3.0 nm or less, and still more preferably 1.5 nm or less.

The standard deviation of the absolute value of the in-plane phase difference (Re) per 1 mm of the thickness of the shaped article is preferably 2.0 nm or less, more preferably 1.5 nm or less, and even more preferably 1.0 nm or less.

Note that the in-plane phase difference of the shaped article can be measured by the method described in the EXAMPLES section below.

The shaped article according to the present embodiment has a thickness of preferably 1.5 mm or less, more preferably 1.2 mm or less, and even more preferably 1.0 mm or less.

(Applications of Shaped Article)

A shaped article produced from the methacrylic resin composition according to the present disclosure can be suitably used for applications such as optical components for household products, office automation appliances, audiovisual apparatuses, electric components for batteries, lighting apparatuses, automotive parts.

Examples of optical components for household products, office automation appliances, audiovisual apparatuses, electric components for batteries, lighting apparatuses, and the like include, for example, light guide plates, display front plates, and touch panels used for displays of smartphones, PDAs, tablet PCs, liquid crystal televisions, etc., lenses of cameras on smartphones and tablet PCs, and optical lens components of head mounted displays, liquid crystal projectors, and the like, such as prism elements, waveguides, and lenses, among others, small and thin optical lens having varied thicknesses, optical fibers, sheath materials for optical fibers, phase plates having lenses, Fresnel lenses, or microlens arrays, and optical cover components.

Examples of optical components for automotive parts and the like include light guide plates for in-vehicle displays; panels for in-vehicle meters; optical components for front plates of car navigation systems, head-up displays such as combiners and optical cover components; lenses of in-vehicle cameras; and light guide rods.

Other than the above-listed applications, the shaped article can be preferably used for parts of display apparatuses for digital signage or the like for presenting information on a thin display apparatus which is connected to a network for the purpose of promotion, advertising, or the like, at locations such as camera focus plates, outdoor places, storefronts, public facilities, and public transportation facilities.

EXAMPLES

The following provides a more specific description of the present disclosure through examples and comparative examples. This disclosure is not limited to these examples.

<1. Measurement of Polymerization Conversion>

A part of a polymerization solution of each of the examples and comparative examples was sampled. The sampled polymerization solution was dissolved in chloroform to prepare a 5-mass % solution, and n-decane was added as an internal standard substance. The concentrations of residual monomers in the sample was measured by a gas chromatography apparatus (GC-2010 produced by Shimadzu Corporation) to thereby determine the total mass (a) of the residual monomers in the polymerization solution. The polymerization conversion (%) was then calculated from the calculation formula: (b−a)/b×100, from the total mass (a) and the total mass (b) assuming that all of the monomers added up to the collection of the sample would remain unconsumed in the polymerization solution.

<2. Analysis of Structural Units>

Unless otherwise specified, each structural unit included in methacrylic resins produced in the following examples was identified and the amount of each structural unit was calculated by $^1$H-NMR and $^{13}$C-NMR measurements. The conditions for the $^1$H-NMR and $^{13}$C-NMR measurements were as follows.

Measurement apparatus: DPX-400 produced by Bruker Corporation
Measurement solvent: $CDCl_3$ or $DMSO-d_6$
Measurement temperature: 40° C.

In the case of a methacrylic resin having a lactone ring structure as the cyclic structure thereof, this structure was confirmed by the methods described in JP 2001-151814 A and JP 2007-297620 A.

<3. Measurement of Molecular Weights and Molecular Weight Distribution>

The weight average molecular weight (Mw) and the number average molecular weight (Mn) of the methacrylic resins produced in the following examples and comparative example were measured with the apparatus under the conditions as follows.

Measurement apparatus: Gel permeation chromatograph (HLC-8320GPC) produced by Tosoh Corporation
Measurement conditions
Columns: one TSK guard column Super H-H, two TSK gel Super HM-M, and one TSK gel Super H2500 connected in series in this order.
Column temperature: 40° C.
Developing solvent: tetrahydrofuran; flow rate: 0.6 mL/min; 0.1 g/L of 2,6-di-t-butyl-4-methylphenol (BHT) was added as internal standard
Detector: refractive index (RI) detector
Detection sensitivity: 3.0 mV/min
Sample: solution of 0.02 g of the methacrylic resin or methacrylic resin in 20 mL of tetrahydrofuran, Injection volume: 10 μL Standard samples for calibration curve: Following 10 types of polymethyl methacrylate (PMMA Calibration Kit M-M-10 produced by Polymer Laboratories Ltd.) of differing molecular weight, each having a known monodisperse weight peak molecular weight, were used.

Weight peak molecular weight (Mp)
Standard sample 1: 1,916,000
Standard sample 2: 625,500
Standard sample 3: 298,900
Standard sample 4: 138,600
Standard sample 5: 60,150
Standard sample 6: 27,600
Standard sample 7: 10,290
Standard sample 8: 5,000
Standard sample 9: 2,810
Standard sample 10: 850

The RI detection intensity relative to the elution time of the methacrylic resin was measured under the conditions shown above.

The weight average molecular weight (Mw) and the number average molecular weight (Mn) of the methacrylic resin were determined based on a calibration curve obtained through measurements of the calibration curve standard samples.

<4. Glass Transition Temperature>

The glass transition temperature (Tg) (° C.) of the methacrylic resin was measured according to JIS-K7121.

First, specimens were obtained by cutting approximately 10 mg from a sample at four points (four locations) after the sample has been conditioned (left for 1 week at 23° C.) in a standard state (23° C., 65% RH).

A DSC curve was then plotted using a differential scanning calorimeter (Diamond DSC produced by PerkinElmer Japan) under a nitrogen gas flow rate of 25 mL/min while heating the specimen from room temperature (23° C.) to 200° C. at 10° C./min (primary heating), holding the specimen at 200° C. for 5 minutes to completely melt the specimen, cooling the specimen from 200° C. to 40° C. at 10° C./min, holding the specimen at 40° C. for 5 minutes, and then reheating the specimen under the same heating conditions (secondary heating). The glass transition temperature (Tg) (° C.) was then measured as the intersection point (mid-point glass transition temperature) of a stair-shaped change section of the DSC curve during the secondary heating and a straight line that was equidistant in a vertical axis direction from each extrapolated baseline. Four points were measured per sample and the arithmetic mean (rounded to nearest whole number beyond the decimal point) was taken to be the measured value.

<5. Determination of Composition Distribution of Structural Units>

The methacrylic resin produced in each of the examples and comparative examples was subjected to molecular weight fractionation using the apparatus under the conditions as follows.

Fractionation apparatus: LC-908 produced by Japan Analytical Industry Co., Ltd.

Fractionation conditions:
  Column: SHODEX K-2004
  Eluent: chloroform, flow rate: 3 mL/min
  Detector: UV detector (254 nm)
  Sample: 3-mass % chloroform solution After 3 mL of the sample was injected, fractions were fractionated at 1-min intervals for the elution time between 18 minutes to 43 minutes. The fractionation procedure was repeated three times, and fractions of the same elution time were collected into a single sample.

For each sample selected from the obtained fractions, the composition ratio of each structural unit was determined according to the "<2. Analysis of structural units>" section described above. In addition, for each of these samples, the molecular weight distribution of the methacrylic resin was determined according to the "<3. Measurement of molecular weights and molecular weight distribution>" section described above, and the peak top molecular weight (Mp) was determined from the location of the apex of the peak on the molecular weight distribution curve.

<6. Measurement of Orientational Birefringence>

Each of the methacrylic resins obtained in the examples and comparative examples was formed into a pressed film using a vacuum compression molding machine to obtain an unstretched sample.

Detailed conditions for preparing samples were as follows. Each methacrylic resin was placed into a frame made of polyimide and having a thickness of 150 μm, and was sandwiched with two polyimide films and two iron plates. This sample was then set in the vacuum compression molding machine (SFV-30 produced by Shinto Metal Industries, Ltd.), preheated at 260° C. under a reduced pressure (about 10 kPa) for 10 minutes, and then compressed at 260° C. for 5 minutes at about 10 MPa, and the reduced pressure and the pressing pressure were released. Then the sample was transferred to a compression forming machine for cooling and cooled and solidified.

The resultant pressed film was cured for at least 24 hours in a constant temperature and constant humidity chamber adjusted to a temperature of 23° C. and a humidity of 60%, to thereby obtain an unstretched sample.

The above-mentioned unstretched sample was cut into a piece having a width of 40 mm and a length of 60 mm to prepare a measurement specimen. A tensile test jig was set in Autograph AG-5000D produced by Shimadzu Corporation having a thermostatic bath (TCR-300S) connected thereto. The specimen was subjected to uniaxial free drawing with a chuck separation of 40 mm at a stretching rate of 500 mm/min and a stretching temperature of Tg+20° C., and then immediately taken out and cooled to room temperature. The specimen was then cured for 24 hours in a constant temperature and constant humidity chamber adjusted to a temperature of 23° C. and a humidity of 60% to prepare a stretched film.

Several films were produced which had a draw ratio of about 100% or 300%. A measurement of the degree of orientation by infrared dichroic ratio, which will be described later, and measurements of the orientational birefringence were carried out to determine the respective orientational birefringence when the degrees of orientation were 0.03 and 0.08.

A degree of orientation was determined by infrared dichroic ratio using an infrared spectrometer Tensor 27 produced by Bruker Corporation using the transmission method.

Each measurement was carried out with a wavelength resolution of 2 cm$^{-1}$ and an integration count of 16 times.

The absorbances $A_{\parallel}$ and $A_{\perp}$ of each stretched film were measured by irradiating the film with infrared light which was polarized in the direction horizontal and vertical to the stretching direction, respectively, through a polarization filter.

The infrared dichroic ratio D was determined by the following formula:

$$D = A_{\parallel}/A_{\perp} \quad \text{(c)}$$

Suppose that the angle formed by the direction of the transition moment of the oscillation of the absorption of the functional group of interest and the direction in which the main chain is oriented or extends is represented by α, the degree of orientation f can be represented by the following formula.

$$f = \frac{D-1}{D+2} \times \frac{2\cot^2 a + 2}{2\cot^2 a - 1} \quad \text{(d)}$$

In the examples, the degree of orientation was determined from the absorption at a wave number of 750 cm$^{-1}$ corresponding to the rocking vibration of $CH_2$ in the methyl methacrylate unit, and α of 17°.

The orientational birefringence was determined at a wavelength of 587 nm using KOBRA-WR produced by Oji Scientific Instruments.

The birefringence Δn is defined as follows:

$$\Delta n = n_x - n_y \quad \text{(a)}$$

(where nx represents the refractive index in the stretching direction, and ny is the refractive index in the direction orthogonal to the stretching direction)

The orientational birefringence $\Delta n^{or}$ is expressed by the following equation.

$$\Delta n^{or} = f \times \Delta n^0 \quad \text{(b)}$$

(where $\Delta n^0$ represents the intrinsic birefringence, and f represents the degree of orientation)

<7. Measurement of Photoelastic Coefficient $C_R$>

A film-shaped specimen with a width of 6 mm was cut out from the unstretched sample obtained in the procedure in the "<6. Measurement of orientational birefringence>" section described above. The photoelastic coefficient $C_R$ (Pa$^{-1}$) of this specimen was measured using a birefringence measurement device that is described in detail in *Polymer Engineering and Science* 1999, 39, 2349-2357.

The film-shaped specimen was set in a film tensing device (produced by Imoto Machinery Co., Ltd.) set up in the same constant temperature and constant humidity chamber such that the chuck separation was 50 mm. Next, a birefringence measurement device (RETS-100 produced by Ostuka Electronics Co., Ltd.) was set up such that a laser light path of the device was positioned in a central portion of the film. The birefringence of the specimen was measured while applying tensile stress with a chuck separation of 50 mm at a chuck movement speed of 5 mm/min.

The photoelastic coefficient ($C_R$) (Pa$^{-1}$) was calculated by making a least squares approximation of the relationship between the measured birefringence (Δn) and the tensile stress ($\sigma_R$) and then determining the gradient of the resultant straight line. This calculation was performed using data in a tensile stress range of 2.5 MPa ≤ $\sigma_R$ ≤ 10 MPa.

$$C_R = \Delta n / \sigma_R$$

Note that the birefringence (Δn) is a value determined below.

$$\Delta n = n_x - n_y$$

(where nx is the refractive index in the stretching direction, and ny is the refractive index in the in-plane direction orthogonal to the stretching direction)

<8. Measurement of in-Plane Phase Difference of Injection Molded Piece>

Each of the methacrylic resins produced in Examples 1 to 7 and Comparative Examples 1 to 2 was injection molded by an injection molding machine (AUTO SHOT C Series MODEL 15A produced by FANUC CORPORATION) using a flat plate mold which had a thickness of 1 mm, a width of 60 mm, and a length of 45 mm and has a fan gate, as illustrated in FIG. 1.

FIG. 1(A) is a plan view of the flat plate mold, and FIG. 1(B) is a cross-sectional view when being cut on the plane along the line A-A in FIG. 1(A).

Initially, the lowest injection pressure (short shot point, SSP) under which the mold was completely filled with the resin was determined by carrying out injection molding under different injection pressures under the conditions of a cylinder temperature of 270° C., a mold temperature of 90° C., cooling time of 20 seconds, an injection screw rotation speed of 50 mm/s, and a maintained pressure of 0 kgf/cm². Next, injection molding was carried out by setting the injection pressure to SSP+50 kgf/cm² to produce a flat plate molded piece for measuring the in-plane phase difference.

The in-plane phase difference of the produced flat plate molded piece was measured using PA-200-L produced by Photonic Lattice, Inc. at a wavelength of 520 nm. The in-plane phase difference profile was determined by observing a region (the hatched region in FIG. 1) of a width of 55 mm and a length of 40 mm in the center of the flat plate from above. The average and the standard deviation of the absolute values of the in-plane phase differences (Re) in the region were determined as indicators for the evaluation.

<9. Measurement of Color Tone of Molded Piece>

Each of the methacrylic resins produced in the examples and comparative examples was injection molded by an injection molding machine (AUTO SHOT C Series MODEL 15A produced by FANUC CORPORATION) to produce a strip-shaped specimen having a thickness of 4 mm, a width of 10 mm, and a length of 80 mm under the conditions of a cylinder temperature of 250° C., a mold temperature of 90° C.

The mold was mirror-finished, and each end face on the shorter sides had a slide core structure without a draft. The specimen was obtained which enabled a measurement of the color tone by allowing light to transmit through an optical path length of 80 mm in the long side direction.

The YI of the 80-mm optical path length of the resulting specimen was measured using a color difference meter (ASA-1 produced by Nippon Denshoku Industries Co., Ltd.) with a illuminant C, 2 degree observer.

<10. Color Reproducibility of Simulated Light Guide Unit>

Each of the methacrylic resins produced in the examples and comparative examples was subjected to injection press molding using an injection molding machine having a mold clamping force of 50 tons at a molding temperature of 270° C. and a mold temperature of 90° C., to produce a light guide plate having a thickness of 0.6 mm, a width of 115 mm, and a length of 80 mm provided with dot-like patterns on the bottom surface with a pitch of 100 μm to 300 μm. A simulated light guide unit in which light was emitted to the front surface was produced by disposing a light source at one end face on the long side and disposing a reflective sheet under the bottom surface of the light guide plate. The chromaticities x and y of emitted light were measured using a spectral radiance meter, from the top surface side at 5-mm and 75-mm positions, respectively, from the end face on the light source side (the 75-mm position is the 5-mm position from the end face opposite to the end face where the light source was disposed). The values Δx and Δy obtained by subtracting the values of X and Y at the 5-mm position from the values of X and Y at the 75-mm position, respectively. The smaller the values of Δx and Δy, the smaller the color shift was and the higher the color tone reproducibility was.

[Raw Materials]

Raw materials that were used in the subsequently described examples and comparative examples were as follows.

[[Monomers]]
methyl methacrylate produced by Asahi Kasei Co., Ltd.
N-phenylmaleimide (phMI) produced by Nippon Shokubai Co., Ltd.
N-cyclohexylmaleimide (chMI) produced by Nippon Shokubai Co., Ltd.

[[Polymerization Initiator]]
1,1-di(t-butylperoxy)cyclohexane: PERHEXA C produced by NOF Corporation

[[Chain Transfer Agent]]
n-octyl mercaptan produced by Kao Corporation

[[Antioxidant]]
pentaerythritol tetrakis 3-(3',5'-di-tert-butyl-4'-hydroxyphenyl) propionate: Irganox 1010 produced by BASF
tris(2,4-di-t-butylphenyl)phosphate: Irgafos 168 produced by BASF Example 1

A mixed monomer solution was prepared by measuring out 358.6 kg of methyl methacrylate (hereinafter, denoted as "MMA"), 29.4 kg of N-phenylmaleimide (hereinafter, denoted as "phMI"), 67.7 kg of N-cyclohexylmaleimide (hereinafter, denoted as "chMI"), 0.77 kg of n-octyl mercaptan as a chain transfer agent, and 224.3 kg of meta-xylene (hereinafter, denoted as "mXy"), adding these materials into a 1.25-m³ reactor equipped with a stirring blade and a temperature controller functioning through use of a jacket, and then stirring these materials.

Next, a mixed monomer solution for subsequent addition was prepared by measuring out 88.0 kg of MMA, 6.3 kg of phMI, and 142.4 kg of mXy, adding these materials into a first tank, and then stirring these materials.

The liquid contained in the reactor was subjected to 1 hour of nitrogen bubbling at a rate of 30 L/min, and the liquid in the first tank was subjected to 30 minutes of nitrogen bubbling at a rate of 10 L/min, to remove dissolved oxygen.

Thereafter, the temperature of the solution in the reactor was raised to 115° C. by blowing steam into the jacket, and then the contents of the reactor were stirred at 50 rpm while adding a polymerization initiator solution containing 0.470 kg of 1,1-di(t-butylperoxy)cyclohexane dissolved in 1.905 kg of mXy at a rate of 1.0 kg/hour to initiate polymerization.

The temperature of the solution inside the reactor during polymerization was controlled to 115±2° C. through temperature adjustment using the jacket. Once 30 minutes had passed from the start of polymerization, the rate to add the initiator solution was reduced to 0.5 kg/hour.

Furthermore, the entire amount of the mixed monomer solution for subsequent addition was added from the first tank at an equal rate over 4 hours from 1 hour after the start of polymerization.

Moreover, the rate to add the initiator solution was reduced to 0.25 kg/hour after 3.5 hours from the start of polymerization, and addition was stopped after 5 hours from the start of polymerization.

A polymerization solution containing a methacrylic resin having a cyclic structure in the main chain thereof was obtained after 12 hours from the start of polymerization, and the polymerization was ended.

The polymer solution was sampled after 2 and 12 hours from the start of polymerization, to thereby determine the polymerization conversions from the concentrations of residual monomers. The polymerization conversions of MMA, phMI, and chMI after 2 hours were 78.9%, 77.3%, and 70.4%, respectively, and the polymerization conversions of MMA, phMI, and chMI after 12 hours were 97.9%, 99.4%, and 99.2%, respectively. The polymerization conversions of MMA, phMI, and chMI after 2 hours were converted to the respective consumption rates relative to the total amount of each monomer added up to the end of polymerization by taking the amount of the monomer added after 2 hours from the start of polymerization and later timing taken into consideration. The consumption rates of MMA, phMI, and chMI were 67.2%, 67.1%, and 70.4%, respectively.

The resultant polymerization solution was fed into a concentrating device comprising a tubular heat exchanger and a vaporization tank which had been pre-heated to 250° C. for devolatilization. The condition of the degree of vacuum in the vaporization tank was 10 Torr to 15 Torr. The resin flowed down in the vaporization tank was discharged by a gear pump, was extruded from a strand die, and was pelletized after water cooling to obtain a methacrylic resin.

It was confirmed that the chemical composition of the obtained pelletized polymerized product comprised structural units derived from the monomers MMA, phMI, and chMI in proportions of 81.0 mass %, 6.6 mass %, and 12.4 mass %, respectively. The weight average molecular weight was 108,000, and Mw/Mn was 2.04.

The other physical properties are summarized in Table 1.

Example 2

A methacrylic resin was produced in the same manner as in Example 1 except that the amounts of MMA, phMI, and ChMI added to the reactor were changed to 357.0 kg, 30.1 kg, and 68.9 kg, respectively, and the amounts of MMA and phMI added to the first tank were changed to 87.6 kg and 6.4 kg, respectively. The physical properties of the resultant resin are summarized in Table 1.

Example 3

A methacrylic resin was produced in the same manner as in Example 1 except that the amounts of MMA, phMI, and ChMI added to the reactor were changed to 355.4 kg, 30.8 kg, and 70.1 kg, respectively, and the amounts of MMA and phMI added to the first tank were changed to 87.2 kg and 6.5 kg, respectively, and that 0.550 kg of Irganox 1010 and 0.825 kg of Irgafos 168 were further added as antioxidants, followed by stirring and mixing before devolatilization. The physical properties of the resultant resin are summarized in Table 1.

Example 4

A methacrylic resin was produced in the same manner as in Example 1 except that the amounts of MMA, phMI, and ChMI added to the reactor were changed to 353.8 kg, 31.5 kg, and 70.3 kg, respectively, and the amounts of MMA and phMI added to the first tank were changed to 86.8 kg and 6.6 kg, respectively, and that 0.550 kg of Irganox 1010 and 0.825 kg of Irgafos 168 were further added as antioxidants, followed by stirring and mixing before devolatilization. The physical properties of the resultant resin are summarized in Table 1.

Example 5

A methacrylic resin was obtained in the same manner as in Example 2 except that the amount of n-octyl mercaptan added to the reactor was changed to 0.41 kg. The physical properties of the resultant resin are summarized in Table 1.

Example 6

A methacrylic resin was produced in the same manner as in Example 1 except that the amount of phMI added to the reactor was changed to 28.2 kg and the amount of phMI added to the first tank was changed to 7.5 kg.

The polymer solution was sampled after 2 and 12 hours from the start of polymerization, to thereby determine the polymerization conversions from the concentrations of residual monomers. The polymerization conversions of MMA, phMI, and chMI after 2 hours were 79.0%, 77.0%, and 70.6%, respectively, and the polymerization conversions of MMA, phMI, and chMI after 12 hours were 97.8%, 99.3%, and 99.1%, respectively. The polymerization conversions of MMA, phMI, and chMI after 2 hours were converted to the respective consumption rates relative to the total amount of each monomer added up to the end of polymerization by taking the amount of the monomer added after 2 hours from the start of polymerization and later timing taken into consideration. The consumption rates of MMA, phMI, and chMI were 67.3%, 64.9%, and 70.6%, respectively.

The other physical properties are as listed in Table 1.

Example 7

A methacrylic resin was produced in the same manner as in Example 1 except that the amount of phMI added to the reactor was changed to 27.2 kg and the amount of phMI added to the first tank was changed to 8.5 kg.

The polymer solution was sampled after 2 and 12 hours from the start of polymerization, to thereby determine the polymerization conversions from the concentrations of residual monomers. The polymerization conversions of MMA, phMI, and chMI after 2 hours were 78.8%, 77.2%, and 70.7%, respectively, and the polymerization conversions of MMA, phMI, and chMI after 12 hours were 97.9%, 99.3%, and 99.2%, respectively. The polymerization conversions of MMA, phMI, and chMI after 2 hours were converted to the respective consumption rates relative to the total amount of each monomer added up to the end of polymerization by taking the amount of the monomer added after 2 hours from the start of polymerization and later timing taken into consideration. The consumption rates of MMA, phMI, and chMI were 67.2%, 63.4%, and 70.7%, respectively.

The other physical properties are summarized in Table 1.

Example 8

A reactor equipped with a temperature controller functioning through use of a jacket and a stirring blade was charged with 40 parts by mass of MMA, 60 parts by mass of mXy, and 0.08 parts by mass of n-octyl mercaptan as a chain transfer agent. The solution was subjected to 1 hour of nitrogen bubbling to remove dissolved oxygen. Thereafter, the temperature of the solution in the reactor was raised to 120° C. by blowing steam into the jacket, and then the contents of the reactor were stirred at 50 rpm while adding a polymerization initiator solution containing 0.02 parts by mass of 1,1-di(t-butylperoxy)cyclohexane dissolved in 0.10 parts by mass of mXy at an equal rate for 5 hours to cause polymerization. The resin was then aged at 120° C. for 3 hours, and the polymerization was ended at 8 hours after the start of the polymerization to obtain a solution of PMMA in mXy. After the end of the polymerization, the liquid temperature was lowered to 50° C.

Thereafter, a mixed solution containing 12 parts by mass of monomethylamine and 12 parts by mass of methanol was added dropwise into the reactor at room temperature. The temperature of the liquid was then increased to 170° C., and the liquid was stirred under an increased pressure for 1 hour to cause a glutarimide cyclization reaction to proceed. The temperature of the liquid was lowered to 120° C., and the pressure inside the reactor was reduced to a reduced pressure to distilled off unreacted monomethylamine and methanol, and a part of mXy to obtain a solution containing about 50 mass % of glutarimide cyclized methacrylic polymer in mXy.

The resultant polymerization solution was fed into a concentrating device comprising a tubular heat exchanger and a vaporization tank which had been pre-heated to 250° C. for devolatilization. The condition of the degree of vacuum in the vaporization tank was 10 Torr to 15 Torr. The resin flowed down in the vaporization tank was discharged by a gear pump, was extruded from a strand die, and was pelletized after water cooling to obtain a methacrylic resin.

The composition of the resultant methacrylic resin composition was determined, and the amount of glutarimide structural unit was 5.2 mass %. The weight average molecular weight was 93,000, and Mw/Mn was 1.79.

The other physical properties are summarized in Table 1.

Comparative Example 1

A mixed monomer solution was prepared by measuring out 440.0 kg of MMA, 37.0 kg of phMI, 73.0 kg of chMI, 1.12 kg of n-octyl mercaptan as a chain transfer agent, and 450 kg of mYy, adding these materials into a 1.25-m³ reactor equipped with a stirring blade and a temperature controller functioning through use of a jacket, and then stirring these materials.

The liquid contained in the reactor was subjected to 1 hour of nitrogen bubbling at a rate of 30 L/min to remove dissolved oxygen. Thereafter, the temperature of the solution in the reactor was raised to 125° C. by blowing steam into the jacket, and then the contents of the reactor were stirred at 50 rpm while adding a polymerization initiator solution containing 0.231 kg of 1,1-di(t-butylperoxy)cyclohexane dissolved in 5.769 kg of mXy for 6 hours at a rate of 1 kg/hour to initiate polymerization.

The temperature of the solution inside the reactor during polymerization was controlled to 125±2° C. through temperature adjustment using the jacket. A polymerization solution containing a methacrylic resin having a cyclic structure in the main chain thereof was obtained once 8 hours had passed from the start of polymerization. The polymer solution was sampled after 2.5, 4, and 8 hours (at the end of polymerization) after the start of polymerization, to thereby determine the polymerization conversions from the concentrations of residual monomers. The polymerization conversions of MMA, phMI, and chMI after 2.5 hours were 68.2%, 66.1%, and 54.1%, respectively, the polymerization conversions of MMA, phMI, and chMI after 4 hours were 83.8%, 81.5%, and 71.3%, respectively, and the polymerization conversions of MMA, phMI, and chMI after 8 hours were 95.9%, 96.8%, and 93.3%, respectively.

The resultant polymerization solution was fed into a concentrating device comprising a tubular heat exchanger and a vaporization tank which had been pre-heated to 250° C. for devolatilization. The condition of the degree of vacuum in the vaporization tank was 10 Torr to 15 Torr. The resin flowed down in the vaporization tank was discharged by a gear pump, was extruded from a strand die, and was pelletized after water cooling to obtain a methacrylic resin.

It was confirmed that the chemical composition of the obtained pelletized polymerized product comprised structural units derived from the monomers MMA, phMI, and chMI in proportions of 80.2 mass %, 6.8 mass %, and 13.0 mass %, respectively. The weight average molecular weight was 131,000, and Mw/Mn was 2.26.

The other physical properties are summarized in Table 1.

Comparative Example 2

A mixed monomer solution was prepared by measuring out 335.5 kg of MMA, 37.4 kg of phMI, 67.1 kg of chMI, 0.30 kg of n-octyl mercaptan as a chain transfer agent, and 236.9 kg of mXy, adding these materials into a 1.25-m³ reactor equipped with a stirring blade and a temperature controller functioning through use of a jacket, and then stirring these materials.

Then, 123.1 kg of mXy was weighed in the first tank as a solvent for subsequent addition.

Further, 110.0 kg of MMA and 90.0 kg of mXy were weighed in the second tank, and mixed and stirred to prepare an MMA solution for subsequent addition.

The liquid contained in the reactor was subjected to 1 hour of nitrogen bubbling at a rate of 30 L/min, and the liquids in the first and second tanks were subjected to 30 minutes of nitrogen bubbling at a rate of 10 L/min, to remove dissolved oxygen.

Thereafter, the temperature of the solution in the reactor was raised to 123° C. by blowing steam into the jacket, and then the contents of the reactor were stirred at 50 rpm while adding a polymerization initiator solution containing 0.481 kg of 1,1-di(t-butylperoxy)cyclohexane dissolved in 2.644 kg of mXy at a rate of 1.0 kg/hour to initiate polymerization.

The temperature of the solution inside the reactor during polymerization was controlled to 123±2° C. through temperature adjustment using the jacket. Once 30 minutes had passed from the start of polymerization, the rate to add the initiator solution was reduced to 0.25 kg/hour. In addition, the entire amount of the solvent for subsequent addition was added from the first tank at an equal rate over 3.5 hours from the 30 minutes after the start of polymerization.

The rate to add the initiator solution was then increased to 0.75 kg/hour after 4 hours from the start of polymerization, and the entire amount of the MMA solution for subsequent addition was added at an equal rate for 2 hours from the second tank.

Moreover, the rate to add the initiator solution was reduced to 0.25 kg/hour after 6 hours from the start of polymerization, and addition was stopped after 7 hours from the start of polymerization.

After 8 hours from the start of polymerization, a polymer solution containing a methacrylic resin was obtained and the polymerization was ended.

The polymer solution was sampled after 2.5 and 8 hours from the start of polymerization, to thereby determine the polymerization conversions from the concentrations of residual monomers. The polymerization conversions after 2.5 hours of MMA, phMI, and chMI were 83.5%, 80.1%, and 71.9%, respectively, and the polymerization conversions after 8 hours were 92.0%, 99.1%, and 97.8%, respectively. The polymerization conversions after 2.5 hours were converted to the respective consumption rates relative to the total amount of each monomer added up to the end of polymerization by taking the amount of the monomer added after 2.5 hours from the start of polymerization and later timing taken into consideration. The consumption rates of MMA, phMI, and chMI were 62.9%, 80.1%, and 71.9%, respectively.

The resultant polymerization solution was fed into a concentrating device comprising a tubular heat exchanger and a vaporization tank which had been pre-heated to 250° C. for devolatilization. The condition of the degree of vacuum in the vaporization tank was 10 Torr to 15 Torr. The resin flowed down in the vaporization tank was discharged by a gear pump, was extruded from a strand die, and was pelletized after water cooling to obtain a methacrylic resin.

It was confirmed that the chemical composition of the obtained pelletized polymerized product comprised structural units derived from the monomers MMA, phMI, and chMI in proportions of 80.0 mass %, 7.2 mass %, and 12.8 mass %, respectively. The weight average molecular weight was 137,000, and Mw/Mn was 2.32.

The other physical properties are summarized in Table 1.

Comparative Example 3

A mixed monomer solution was prepared by measuring out 141.2 kg of MMA, 14.6 kg of phMI, 27.5 kg of chMI, 0.174 kg of n-octyl mercaptan as a chain transfer agent, and 147.0 kg of mXy, adding these materials into a 1.25-m$^3$ reactor equipped with a stirring blade and a temperature controller functioning through use of a jacket, and then stirring these materials.

Next, a mixed monomer solution for subsequent addition was prepared by measuring out 262.3 kg of MMA, 27.1 kg of phMI, 51.1 kg of chMI, and 273.0 kg of mXy, adding these materials into a first tank, and then stirring these materials.

In addition, 56.1 kg of MMA was measured out in a second tank.

The liquid contained in the reactor was subjected to 1 hour of nitrogen bubbling at a rate of 30 L/min, and the liquid in each of the first and second tanks was subjected to 30 minutes of nitrogen bubbling at a rate of 10 L/min, to remove dissolved oxygen.

Thereafter, the temperature of the solution in the reactor was raised to 124° C. by blowing steam into the jacket, and then the contents of the reactor were stirred at 50 rpm while adding a polymerization initiator solution containing 0.348 kg of 1,1-di(t-butylperoxy)cyclohexane dissolved in 4.652 kg of mXy at a rate of 2 kg/hour to initiate polymerization.

The temperature of the solution inside the reactor during polymerization was controlled to 124±2° C. through temperature adjustment using the jacket. Once 30 minutes had passed from the start of polymerization, the rate to add the initiator solution was reduced to 1 kg/hour and the mixed monomer solution for subsequent addition was added from the first tank over 2 hours at 306.8 kg/hour.

Next, once 2 hours and 45 minutes had passed from the start of polymerization, the entire amount of MMA in the second tank was added over 30 minutes at a rate of 112.1 kg/hour.

Moreover, the rate to add the initiator solution was reduced to 0.5 kg/hour after 3.5 hours from the start of polymerization, 0.25 kg/hour after 4.5 hours from the start of polymerization, and 0.125 kg/hour after 6 hours from the start of polymerization, and addition was stopped after 7 hours from the start of polymerization.

A polymerization solution containing a methacrylic resin having a cyclic structure in the main chain thereof was obtained after 10 hours from the start of polymerization.

The polymer solution was sampled after 3.25 and 10 hours from the start of polymerization, to thereby determine the polymerization conversions from the concentrations of residual monomers. The polymerization conversions of MMA, phMI, and chMI after 3.25 hours were 69.5%, 68.9%, and 63.1%, respectively, and the polymerization conversions of MMA, phMI, and chMI after 10 hours were 96.6%, 96.0%, and 91.8%, respectively. The polymerization conversions after 2 hours were converted to the respective consumption rates relative to the total amount of each monomer added up to the end of polymerization by taking the amount of the monomer added after 2 hours from the start of polymerization and later timing taken into consideration. The consumption rates of MMA, phMI, and chMI were 69.5%, 68.9%, and 63.1%, respectively.

The resultant polymerization solution was fed into a concentrating device comprising a tubular heat exchanger and a vaporization tank which had been pre-heated to 250° C. for devolatilization. The condition of the degree of vacuum in the vaporization tank was 10 Torr to 15 Torr. The resin flowed down in the vaporization tank was discharged by a gear pump, was extruded from a strand die, and was pelletized after water cooling to obtain a methacrylic resin.

It was confirmed that the chemical composition of the obtained pelletized polymerized product comprised structural units derived from the monomers MMA, phMI, and chMI in proportions of 79.8 mass %, 7.2 mass %, and 13.0 mass %, respectively. The weight average molecular weight was 141,000, and Mw/Mn was 1.96.

The other physical properties are summarized in Table 1.

Comparative Example 4

A methacrylic resin composition having a glutarimide structure was produced by imidizing polymethyl methacrylate with monomethylamine using a co-rotating twin screw extruder.

Polymethyl methacrylate having an Mw of 108,000 was supplied from a hopper at 20 kg/hour to the co-rotating twin screw extruder having a screw diameter of 40 mm, a cylinder temperature of the extruder set at 270° C., and a screw rotation speed set at 150 rpm, while nitrogen was made to flow in the extruder at a flow rate of 200 mL/min. After the resin was made to be molten and filled by a kneading block, 1.8 parts by mass of monomethylamine relative to the amount of the raw material resin was injected from the nozzle to thereby cause an imidization reaction. A reverse flight was disposed at the end of the reaction zone (upstream to the vent port) to fill the resin. Any by-products and excess methylamine after the reaction were removed by reducing the pressure in the vent port to 50 Torr. The resin which was discharged as strands from the dice disposed at the outlet of the extruder was cooled in a water tank and then pelletized by a pelletizer, to thereby produce an imide resin.

Thereafter, the resultant imide resin was fed at 20 kg/hour to a co-rotating twin screw extruder having a screw diameter of 40 mm, a cylinder temperature of the extruder set at 250° C., and a screw rotation speed set at 150 rpm. After the resin was made to be molten and filled by a kneading block, a mixed solution of dimethyl carbonate and triethylamine as esterifying agents was injected from a nozzle to decrease the amount of carboxylic acid groups in the resin. The amounts of dimethyl carbonate and triethylamine were 3.2 parts by mass and 0.8 parts by mass, respectively, per 100 parts by mass of the imide resin. A reverse flight was disposed at the end of the reaction zone to fill the resin. Any by-products and excess dimethyl carbonate after the reaction were removed by reducing the pressure in the vent port to 50 Torr. The resin which was discharged as strands from the dice disposed at the outlet of the extruder was cooled in a water tank and then pelletized by a pelletizer, to thereby produce a methacrylic resin composition having a glutarimide structure.

The composition of the resultant methacrylic resin composition was determined, and the amount of glutarimide structural unit was 5.2 mass %. The weight average molecular weight was 102,000, and Mw/Mn was 1.76.

The other physical properties are summarized in Table 1.

TABLE 1-1

| | | | Example 1 | | | | Example 2 | | | | Example 3 | | |
|---|---|---|---|---|---|---|---|---|---|---|---|---|---|
| Conversion (%) | | | MMA | PhMI | ChMI | | MMA | PhMI | ChMI | | MMA | PhMI | ChMI |
| | | 2 h | 78.9 | 77.3 | 70.4 | | | | | | | | |
| | | 12 h | 97.9 | 99.4 | 99.2 | 12 h | 98.0 | 99.3 | 99.3 | 12 h | 98.1 | 99.3 | 99.3 |
| Composition of comonomers | | | MMA | PhMI | ChMI | | MMA | PhMI | ChMI | | MMA | PhMI | ChMI |
| (wt %) | | | 81.0 | 6.6 | 12.4 | | 80.6 | 6.7 | 12.7 | | 80.3 | 6.8 | 12.9 |
| Distribution of composition of structural | | Mp (×10,000) | MMA | PhMI | ChMI | Mp (×10,000) | MMA | PhMI | ChMI | Mp (×10,000) | MMA | PhMI | ChMI |
| units (wt %) | | 25.3 | 81.4 | 6.5 | 12.1 | 25.2 | 81.3 | 6.4 | 12.3 | 25.1 | 80.9 | 6.4 | 12.7 |
| | | 17.6 | 81.1 | 6.6 | 12.3 | 18.1 | 81.0 | 6.6 | 12.4 | 17.9 | 80.5 | 6.6 | 12.9 |
| | | 11.1 | 80.9 | 6.7 | 12.4 | 10.8 | 80.8 | 6.6 | 12.6 | 10.9 | 80.3 | 6.6 | 13.1 |
| | | 8.8 | 80.8 | 6.7 | 12.5 | 8.5 | 80.6 | 6.7 | 12.7 | 8.4 | 80.0 | 6.9 | 13.1 |
| | | 4.8 | 80.4 | 6.8 | 12.8 | 4.9 | 80.4 | 6.7 | 12.9 | 5.0 | 79.8 | 6.9 | 13.3 |
| Molecular weight | Mw (×10,000) | | | 10.8 | | | | 10.9 | | | | 11.1 | |
| | Mn (×10,000) | | | 5.3 | | | | 5.4 | | | | 5.5 | |
| | Mw/Mn | | | 2.04 | | | | 2.02 | | | | 2.02 | |
| Tg | (° C.) | | | 134 | | | | 134 | | | | 133 | |
| Orientational birefringence | Degree of orientation f = 0.03 | | | $0.4 \times 10^{-5}$ | | | | $0.8 \times 10^{-5}$ | | | | $1.5 \times 10^{-5}$ | |
| | Degree of orientation f = 0.08 | | | $-2.4 \times 10^{-5}$ | | | | $-1.6 \times 10^{-5}$ | | | | $-0.9 \times 10^{-5}$ | |
| $C_R$ | $(Pa^{-1})$ | | | $-0.1 \times 10^{-12}$ | | | | $-0.1 \times 10^{-12}$ | | | | $0.1 \times 10^{-12}$ | |
| Re of 1-mm thick llat plate | Average (nm) | | | 1.3 | | | | 0.8 | | | | 1.4 | |
| | SD (nm) | | | 1.1 | | | | 0.5 | | | | 1.2 | |
| Short strip of 80 mm long | Y1 (−) | | | 13.9 | | | | 14.1 | | | | 14.1 | |
| Light guide plate Chromaticity | Δx | | | 0.011 | | | | 0.012 | | | | 0.012 | |
| | Δy | | | 0.017 | | | | 0.018 | | | | 0.017 | |
| | | | Example 4 | | | | | Example 5 | | | | | |
| Conversion (%) | | | MMA | PhMI | ChMI | | MMA | PhMI | ChMI | | | | |
| | | 12 h | 98.2 | 99.2 | 99.1 | 12 h | 98.3 | 99.5 | 99.95 | | | | |
| Composition of copolymers | | | MMA | PhMI | ChMI | | MMA | PhMI | ChMI | | | | |
| (wt %) | | | 80.1 | 7.0 | 12.9 | | 80.6 | 6.7 | 12.7 | | | | |
| | | Mp (×10,000) | MMA | PhMI | ChMI | Mp (×10,000) | MMA | PhMI | ChMI | | | | |
| Distribution of composition of structural units (wt %) | | 25.1 | 80.8 | 6.6 | 12.6 | 25.1 | 81.4 | 6.3 | 12.3 | | | | |
| | | 18.2 | 80.3 | 6.6 | 13.1 | 17.8 | 81.0 | 6.5 | 12.5 | | | | |
| | | 11.1 | 80.0 | 6.8 | 13.2 | 11.3 | 80.7 | 6.6 | 12.7 | | | | |
| | | 8.5 | 79.7 | 7.1 | 13.2 | 8.6 | 80.5 | 6.7 | 12.8 | | | | |
| | | 5.0 | 79.5 | 7.2 | 13.3 | 4.9 | 80.3 | 6.7 | 13.0 | | | | |
| Molecular weight | Mw (×10,000) | | | 10.7 | | | | 13.5 | | | | | |
| | Mw (×10,000) | | | 5.3 | | | | 6.2 | | | | | |
| | Mw/Mn | | | 2.02 | | | | 2.18 | | | | | |

TABLE 1-1-continued

| | | | |
|---|---|---|---|
| Tg | (° C.) | 133 | 134 |
| Orientational birefringence | Degree of orientation f = 0.03 | $2.4 \times 10^{-5}$ | $0.7 \times 10^{-5}$ |
| | Degree of orientation f = 0.08 | $-0.4 \times 10^{-5}$ | $-1.8 \times 10^{-5}$ |
| $C_R$ | (Pa$^{-1}$) | $0.1 \times 10^{-12}$ | $-0.2 \times 10^{-12}$ |
| Re of 1-m thick flat plate | Average (nm) | 2.5 | 2.4 |
| | SD (nm) | 1.6 | 1.5 |
| Short strip of 80 mm long | YI (—) | 14.2 | 14.0 |
| Light guide plate Chromaticity | Δx | 0.012 | 0.012 |
| | Δy | 0.018 | 0.018 |

TABLE 1-2

| | | Example 6 | | | | Example 7 | | | | Example 8 | |
|---|---|---|---|---|---|---|---|---|---|---|---|
| Conversion (%) | | MMA | PhMI | ChMI | | MMA | PhMI | ChMI | | | MMA |
| | 2 h | 79.0 | 77.0 | 70.6 | 2 h | 78.8 | 77.2 | 70.7 | 8 h | | 92.2 |
| | 12 h | 97.8 | 99.3 | 99.1 | 12 h | 97.9 | 99.3 | 99.2 | | | |
| Composition of comonomers | | MMA | PhMI | ChMI | | MMA | PhMI | ChMI | | Glutarimide ring structure | |
| (wt %) | | 81.0 | 6.6 | 12.4 | | 81.0 | 6.6 | 12.4 | | 5.2 | |
| Distribution of composition of structural units (wt %) | Mp (×10,000) | MMA | PhMI | ChMI | Mp (×10,000) | MMA | PhMI | ChMI | Mp (×10,000) | Glutarimide ring structure | |
| | 25.2 | 81.9 | 6.0 | 12.1 | 24.9 | 82.3 | 5.5 | 12.2 | 24.9 | 4.9 | |
| | 17.4 | 81.4 | 6.4 | 12.2 | 17.6 | 81.5 | 6.0 | 12.5 | 17.6 | 5.1 | |
| | 11.0 | 80.9 | 6.7 | 12.4 | 10.9 | 80.9 | 6.6 | 12.5 | 10.9 | 5.2 | |
| | 8.9 | 80.4 | 6.9 | 12.7 | 8.2 | 80.2 | 7.1 | 12.7 | 8.2 | 5.2 | |
| | 4.9 | 79.8 | 7.3 | 12.9 | 5.0 | 79.5 | 7.6 | 12.9 | 5.0 | 5.3 | |
| Molecular weight | Mw (×10,000) | 10.7 | | | | 10.9 | | | | 9.3 | |
| | Mn (×10,000) | 5.2 | | | | 5.3 | | | | 5.2 | |
| | Mw/Mn | 2.06 | | | | 2.06 | | | | 1.79 | |
| Tg | (° C.) | 134 | | | | 134 | | | | 122 | |
| Orientational birefringence | Degree of orientation f = 0.03 | $0.2 \times 10^{-5}$ | | | | $0.3 \times 10^{-5}$ | | | | $-0.5 \times 10^{-5}$ | |
| | Degree of orientation f = 0.08 | $-3.2 \times 10^{-5}$ | | | | $-4.5 \times 10^{-5}$ | | | | $-3.8 \times 10^{-5}$ | |
| $C_R$ | (Pa$^{-1}$) | $-0.1 \times 10^{-12}$ | | | | $-0.1 \times 10^{-12}$ | | | | $-3.0 \times 10^{-12}$ | |
| Re of 1-mm thick flat plate | Average (nm) | 2.7 | | | | 3.5 | | | | 3.2 | |
| | SD (nm) | 1.8 | | | | 2.1 | | | | 1.9 | |
| Short strip of 80 mm long | YI (—) | 14.1 | | | | 14.2 | | | | 14.9 | |
| Light guide plate Chromaticity | Δx | 0.012 | | | | 0.012 | | | | 0.013 | |
| | Δy | 0.018 | | | | 0.018 | | | | 0.019 | |

| | | Comparative Example 1 | | | | Comparative Example 2 | | |
|---|---|---|---|---|---|---|---|---|
| Conversion (%) | | MMA | PhMI | ChMI | | MMA | PhMI | ChMI |
| | 2.5 h | 68.2 | 66.1 | 54.1 | 2.5 h | 83.5 | 80.1 | 71.9 |
| | 8 h | 95.9 | 96.8 | 93.3 | 8 h | 92.0 | 99.1 | 97.8 |
| Composition of copolymers | | MMA | PhMI | ChMI | | MMA | PhMI | ChMI |
| (wt %) | | 80.2 | 6.8 | 13.0 | | 80.0 | 7.2 | 12.8 |
| | Mp (×10,000) | MMA | PhMI | ChMI | Mp (×10,000) | MMA | PhMI | ChMI |
| Distribution of composition of structural units (wt %) | 25.3 | 83.1 | 6.4 | 10.5 | 25.0 | 78.0 | 8.5 | 13.5 |
| | 18.3 | 81.8 | 6.6 | 11.6 | 18.1 | 79.4 | 8.3 | 12.7 |
| | 11.4 | 80.4 | 6.7 | 12.9 | 10.9 | 80.1 | 7.1 | 12.8 |
| | 8.1 | 79.2 | 6.9 | 13.9 | 8.4 | 81.1 | 6.8 | 12.1 |
| | 4.7 | 77.8 | 6.9 | 15.3 | 4.6 | 81.5 | 6.7 | 11.8 |
| Molecular weight | Mw (×10,000) | 13.1 | | | | 13.7 | | |
| | Mw (×10,000) | 5.8 | | | | 5.9 | | |
| | Mw/Mn | 2.26 | | | | 2.32 | | |
| Tg | (° C.) | 133 | | | | 135 | | |

TABLE 1-2-continued

| | | | |
|---|---|---|---|
| Orientational birefringence | Degree of orientation f = 0.03 | −1.0 × 10⁻⁵ | −0.5 × 10⁻⁵ |
| | Degree of orientation f = 0.08 | −8.8 × 10⁻⁵ | −4.4 × 10⁻⁵ |
| $C_R$ | (Pa⁻¹) | −0.2 × 10⁻¹² | −0.1 × 10⁻¹² |
| Re of 1-mm thick flat plate | Average (nm) | 8.2 | 4.5 |
| | SD (nm) | 3.8 | 2.3 |
| Short strip of 80 mm long | YI (−) | 32.3 | 19.5 |
| Light guide plate Chromaticity | Δx | 0.029 | 0.017 |
| | Δy | 0.038 | 0.023 |

TABLE 1-3

| | | Comparative Example 3 | | | Comparative Example 4 | |
|---|---|---|---|---|---|---|
| Conversion-(%) | | MMA | PhMI | ChMI | | |
| | 3.25 h | 69.5 | 68.9 | 63.1 | | |
| | 10 h | 96.6 | 96.0 | 91.8 | | |
| Composition of copolymers | | MMA | PhMI | ChMI | Glutarimide ring structure | |
| (wt %) | | 79.8 | 7.2 | 13.0 | 5.2 | |
| Distribution of composition of structural units (wt %) | Mp (×10,000) | MMA | PhMI | ChMI | Mp (×10,000) | Glutarimide ring structure |
| | 25.1 | 81.5 | 7.2 | 11.3 | 24.5 | 2.7 |
| | 17.5 | 80.3 | 7.1 | 12.5 | 17.7 | 5.0 |
| | 11.3 | 79.9 | 7.2 | 12.9 | 10.8 | 5.2 |
| | 8.8 | 78.0 | 7.3 | 14.7 | 8.1 | 5.3 |
| | 4.8 | 73.1 | 10.6 | 16.3 | 4.9 | 6.3 |
| Molecular weight | Mw (×10,000) | 14.1 | | | 10.2 | |
| | Mn (×10,000) | 7.2 | | | 5.8 | |
| | Mw/Mn | 1.96 | | | 1.76 | |
| Tg | (° C.) | 135 | | | 122 | |
| Orientational birefringence | Degree of orientation f = 0.03 | 0.5 × 10⁻⁵ | | | 0.5 × 10⁻⁵ | |
| | Degree of orientation f = 0.08 | 2.4 × 10⁻⁵ | | | 6.5 × 10⁻⁵ | |
| $C_R$ | (Pa⁻¹) | 0.1 × 10⁻¹² | | | −3.0 × 10⁻¹² | |
| Re of 1-m thick flat plate | Average (nm) | 4.8 | | | 6 5 | |
| | SD (nm) | 2.3 | | | 2.5 | |
| Short strip of 80 mm long | YI (−) | 28.1 | | | 27.8 | |
| Light guide plate Chromaticity | Δx | 0.025 | | | 0.025 | |
| | Δy | 0.033 | | | 0.033 | |

As evident from the examples and comparative examples, in the methacrylic resins having cyclic structural units derived from N-substituted maleimide monomers, suppose that the consumption rate is defined as the proportion of the amount consumed relative to the total amount of each monomer added by the end of polymerization, in the examples in which monomers were subsequently added for polymerization at a point in time when the consumption rate of methyl methacrylate was 60 to 70% so that the difference between the consumption rates of N-phenylmaleimide and N-cyclohexylmaleimide recreased, the composition distribution of structural units having cyclic structures was small. Accordingly, when the composition was adjusted so that the orientational birefringence when the degree of orientation was 0.03 had a positive value, there was a composition range in which the orientational birefringence when the degree of orientation was 0.08 had a negative value. As a result, a shaped article obtained by injection molding this resin had a low birefringence.

In contrast, in the comparative example in which the difference between the consumption rates of N-phenylmaleimide and N-cyclohexylmaleimide was large at a point in time when the consumption rate of methyl methacrylate was 60 to 70%, the composition distribution of the structural units having cyclic structures was large. Thus, the composition could not be adjusted so that the sign of the orientational birefringence when the degree of orientation was 0.03 became different from the sign of the orientational birefringence when the degree of orientation was 0.08. As a result, the birefringence of a shaped article could not be reduced sufficiently.

Further, in the methacrylic resins having the glutarimide-based structural unit, the polymer having a uniform composition distribution of cyclic structures could be obtained by causing a cyclization reaction in the solution state. There was a composition range in which the sign of the orientational birefringence when the degree of orientation was 0.03 became different from the sign of the orientational birefringence when the degree of orientation was 0.08. As a result, a shaped article having a low birefringence was obtained.

Example 9

On both sides of the injection molded plate produced in Example 1, Acier E50PG produced by Nidek Co., Ltd. was sprayed. The coats were then dried and irradiated with ultraviolet light of about 1000 mJ/cm$^2$ using a high-pressure mercury lamp to thereby form hard coating layers with a thickness of about 3 μm.

Anti-reflection layers were then formed by depositing TiO$_2$ (film thickness: 13 nm), SiO$_2$ (film thickness: 36 nm), TiO$_2$ (film thickness: 119 nm), and SiO$_2$ (film thickness: 88 nm) in this order, by the vacuum evaporation.

The total light transmittance of the injection molded plate produced in Example 1 was 92.5%, whereas the injection molded plate provided with hard coating layers and the anti-reflection layers had a favorable total light transmittance of 97.5%.

When a cross-cut test was performed according to JIS K5600-5-6, no peeling of the hard coating layers was observed.

Next, the injection molded plate provided with the hard coating layers and the anti-reflection layers formed thereon was placed in a constant temperature and humidity bath at a temperature of 85° C. and a relative humidity of 85% for 500 hours. Thereafter, the total light transmittance was measured and a cross-cut test was performed in the similar manner. No changes were observed from the injection molded plate before it was placed in the constant temperature and humidity bath.

INDUSTRIAL APPLICABILITY

The methacrylic resin according to the present embodiment has a high heat resistance, and an injection molded shaped article produced from the methacrylic resin or a composition thereof exhibits a high level of control on the birefringence.

The methacrylic resin shaped article according to the present embodiment can be applied to optical components for household products, office automation appliances, audio-visual apparatuses, electric components for batteries, lighting apparatuses, and the like, including, for example, light guide plates, display front plates, and touch panels used for displays of smartphones, PDAs, tablet PCs, liquid crystal televisions, etc., lenses of cameras on smartphones and tablet PCs, and optical lens components of head mounted displays, liquid crystal projectors, and the like, such as prism elements, waveguides, and lenses, among others, small and thin optical lens having varied thicknesses, optical fibers, sheath materials for optical fibers, phase plates having lenses, Fresnel lenses, or microlens arrays, and optical cover components.

Examples of optical components for automobiles and the like include light guide plates for in-vehicle displays; panels for in-vehicle meters; optical components for front plates of car navigation systems, head-up displays such as combiners and optical cover components; lenses of in-vehicle cameras; and light guide rods.

Other than the above-listed applications, the shaped article can be preferably used for parts of display apparatuses for digital signage or the like for presenting information on a thin display apparatus which is connected to a network for the purpose of promotion, advertising, or the like, at locations such as camera focus plates, outdoor places, storefronts, public facilities, and public transportation facilities.

The invention claimed is:

1. A methacrylic resin,
the methacrylic resin having a cyclic structure in a main chain thereof,
the methacrylic resin having a glass transition temperature of higher than 120° C. and 160° C. or lower,
wherein a sign of an orientational birefringence when being oriented so as to have a degree of orientation of 0.03 is different from the sign of the orientational birefringence when being oriented so as to have a degree of orientation of 0.08.

2. The methacrylic resin according to claim 1, wherein
an absolute value of the orientational birefringence when being oriented so as to have a degree of orientation of 0.03 is $0.1 \times 10^{-5}$ or more and $5.0 \times 10^{-5}$ or less, and
the absolute value of the orientational birefringence when being oriented so as to have a degree of orientation of 0.08 is $8.0 \times 10^{-5}$ or less.

3. The methacrylic resin according to claim 2, wherein
the absolute value of the orientational birefringence when being oriented so as to have a degree of orientation of 0.03 is $0.1 \times 10^{-5}$ or more and $3.0 \times 10^{-5}$ or less, and
the absolute value of the orientational birefringence when being oriented so as to have a degree of orientation of 0.08 is $5.0 \times 10^{-5}$ or less.

4. A methacrylic resin,
the methacrylic resin having a structural unit having a cyclic structure in the main chain thereof,
the methacrylic resin having a glass transition temperature of higher than 120° C. and 160° C. or lower,
wherein a difference in an abundance ratio of the structural unit having the cyclic structure in the main chain thereof is 3.0 mass % or less between a fraction component having a peak top molecular weight of 40,000 to 50,000 and a fraction component having a peak top molecular weight of 240,000 to 260,000, the fraction components being obtained through a molecular weight fractionation.

5. The methacrylic resin according to claim 4, wherein
an absolute value of a difference between an absolute value of an orientational birefringence when being oriented so as to have a degree of orientation of 0.03 and the absolute value of the orientational birefringence when being oriented so as to have a degree of orientation of 0.08 is $5.0 \times 10^{-5}$ or less.

6. The methacrylic resin according to claim 4, wherein
the absolute value of the orientational birefringence when being oriented so as to have a degree of orientation of 0.03 is $0.1 \times 10^{-5}$ or more and $5.0 \times 10^{-5}$ or less, and
the absolute value of the orientational birefringence when being oriented so as to have a degree of orientation of 0.08 is $8.0 \times 10^{-5}$ or less.

7. The methacrylic resin according to any one of claims 1 to 6, wherein a yellowness index (YI) of a molded piece produced by injection molding the methacrylic resin measured in an optical path length of 80 mm is 20 or less.

8. The methacrylic resin according to any one of claims 1 to 6, wherein the methacrylic resin has a photoelastic coefficient of $-3 \times 10^{-12}$ to $+3 \times 10^{-12}$ Pa$^{-1}$.

9. The methacrylic resin according to any one of claims 1 to 6, wherein the methacrylic resin comprises an N-substituted maleimide monomer-derived structural unit.

10. The methacrylic resin according to any one of claims 1 to 6, wherein the methacrylic resin comprises a glutarimide structural unit.

11. A shaped article comprising the methacrylic resin according to any one of claims 1 to 6, or a methacrylic resin composition comprising the methacrylic resin according to any one of claims 1 to 6.

12. The shaped article according to claim 11, wherein the shaped article has a thickness of 1.5 mm or less.

13. An optical component or an automotive part comprising the shaped article according to claim 11.

* * * * *